US012521743B2

(12) United States Patent
Fideler et al.

(10) Patent No.: US 12,521,743 B2
(45) Date of Patent: Jan. 13, 2026

(54) COMPACT AIR-DRIVEN FLUID SPRAYER WITH REPLACEABLE CARTRIDGE ASSEMBLY

(71) Applicant: Wagner Spray Tech Corporation, Plymouth, MN (US)

(72) Inventors: Brian Lee Fideler, Jordan, MN (US); Joseph W. Kieffer, Chanhassen, MN (US)

(73) Assignee: Wagner Spray Tech Corp, Plymouth, MN (US)

( * ) Notice: Subject to any disclaimer, the term of this patent is extended or adjusted under 35 U.S.C. 154(b) by 274 days.

(21) Appl. No.: 18/307,433

(22) Filed: Apr. 26, 2023

(65) Prior Publication Data

US 2023/0356244 A1 Nov. 9, 2023

Related U.S. Application Data

(60) Provisional application No. 63/337,783, filed on May 3, 2022.

(51) Int. Cl.

*B05B 9/08* (2006.01)
*B05B 1/00* (2006.01)
*B05B 11/00* (2023.01)

(52) U.S. Cl.

CPC ............ *B05B 9/0861* (2013.01); *B05B 1/005* (2013.01); *B05B 11/0054* (2013.01)

(58) Field of Classification Search

CPC ... B05B 9/0861; B05B 1/005; B05B 11/0054; B05B 15/63; B05B 1/3046;

(Continued)

(56) References Cited

U.S. PATENT DOCUMENTS 6,796,514 B1 9/2004 Schwartz
6,953,155 B2 10/2005 Joseph et al.

(Continued)

FOREIGN PATENT DOCUMENTS

EP 1554053 B1 7/2005

OTHER PUBLICATIONS

International Search Report and Written Opinion for International Application No. PCT/US2023/020139 dated Aug. 28, 2023, 11 pages.

(Continued)

*Primary Examiner* — Vishal Pancholi

(74) *Attorney, Agent, or Firm* — Jonas R. Mellang; KELLY, HOLT & CHRISTENSON PLLC

(57) ABSTRACT

A handheld portable fluid spraying system includes a first disposable cartridge assembly having a first cartridge coupled to a first cartridge assembly body and a first valve coupled to the first cartridge assembly body. The handheld portable fluid spraying system also includes a base assembly comprising an air source configured to generate an airflow. A first portion of the airflow is provided to the first disposable cartridge assembly to pressurize the first disposable cartridge assembly and a second portion of the airflow is provided to a nozzle. The handheld portable fluid spraying system also includes a second disposable cartridge assembly having a second cartridge coupled to a second cartridge assembly body and a second valve coupled to the second cartridge assembly body. The first and second disposable cartridge assemblies are interchangeably connectable to the base assembly.

20 Claims, 34 Drawing Sheets

(58) Field of Classification Search
CPC ..... B05B 7/0861; B05B 7/241; B05B 7/2478; B05B 7/2416; B05B 7/2432; B05B 7/2481; B05B 12/002; B05B 15/62; B65D 83/182
See application file for complete search history.

(56) References Cited

U.S. PATENT DOCUMENTS

| | | | | |
|---|---|---|---|---|
| 9,808,816 | B1 | 11/2017 | Enriquez | |
| 2004/0217198 | A1* | 11/2004 | Lloyd | B05B 7/2421 239/306 |
| 2005/0284963 | A1* | 12/2005 | Reedy | B05B 7/2478 239/526 |
| 2006/0157588 | A1 | 7/2006 | Birrenkott et al. | |
| 2016/0243567 | A1 | 8/2016 | Brose et al. | |
| 2019/0299232 | A1 | 10/2019 | Johnston et al. | |
| 2022/0118235 | A1 | 4/2022 | Wright | |

OTHER PUBLICATIONS

International Preliminary Report on Patentability for International Application No. PCT/US2023/020139, dated Nov. 14, 2024, 7 pages.

* cited by examiner

COMPACT AIR-DRIVEN FLUID SPRAYER WITH REPLACEABLE CARTRIDGE ASSEMBLY

CROSS-REFERENCE TO RELATED APPLICATION

The present application is based on and claims the benefit of U.S. Provisional Patent Application Ser. No. 63/337,783, filed May 3, 2022, the content of which is hereby incorporated by reference in its entirety.

BACKGROUND

A fluid spraying system can be used by an operator to deliver a fluid from a fluid source to an application area. For example, paint can be sprayed, or otherwise applied, by an applicator, such as a spray gun, to an application area, such as a surface of a wall.

The discussion above is merely provided for general background information and is not intended to be used as an aid in determining the scope of the claimed subject matter. The claimed subject matter is not limited to implementations that solve any or all disadvantages noted in the background.

SUMMARY

A handheld portable fluid spraying system is provided. The handheld portable fluid spraying system includes a first disposable cartridge assembly comprising a first cartridge assembly body having a first channel formed therein. The first disposable cartridge assembly comprises a first cartridge coupled to the first cartridge assembly body and configured to house a fluid therein. The first disposable cartridge assembly further comprises a first valve coupled to the first cartridge assembly body and configured to control a flow of fluid through the first channel to a nozzle. The handheld portable fluid spraying system further includes a base assembly comprising an air source configured to generate an airflow, wherein a first portion of the airflow is provided to the first disposable cartridge assembly to pressurize the first disposable cartridge assembly, and a second portion of the airflow is provided to the nozzle. The base assembly further comprises a power supply configured to power the air source. The base assembly further comprises an actuator configured to control the first valve. The handheld portable fluid spraying system further includes a second disposable cartridge assembly comprising a second cartridge assembly body having a second channel formed therein. The second disposable cartridge assembly further comprises a second cartridge coupled to the second cartridge assembly body and configured to house a fluid therein. The second disposable cartridge assembly further comprises a second valve coupled to the second cartridge assembly body and configured to control a flow of fluid through the second channel to the nozzle. The first and second disposable cartridge assemblies are interchangeably connectable to the base assembly.

DETAILED DESCRIPTION OF THE DRAWINGS

For the sake of illustration, but not by limitation, aspects of the present disclosure relate to air-driven paint (or other fluid) sprayers that utilize air flow to spray the paint onto a surface. While examples below are illustrated in the context of paint, it is noted that the present features can also be applicable to sprayers for use with other types of liquids as well. Additionally, while examples below are illustrated in the context of air-driven sprayers such as, but not limited to, high-volume low pressure (HVLP) or low-volume low-pressure (LVLP) sprayers, it is expressly contemplated that the present features can also be applicable to airless sprayers, etc.

Many paint delivery operations employ paint spraying, which is designed to spray a coating of paint onto a desired surface. For instance, spray paint cans (e.g., aerosol cans) provide paint that is secured in a pressurized container and released in an aerosol upon valve actuation. Additionally, spray paint cans provide a user with a convenient and compact means of applying paint onto a surface of interest. In operation, it is difficult to retain consistency of the spray emitted from aerosol spray paint due to the varying nature and conditions of the aerosol cans. This can become increasingly difficult as paint is continuously emitted from the spray can, as a lower volume of paint remains in the spray can and requires the can to be in an upright position in order to continue spraying. Due to the nature of these common aerosol cans, it is difficult to operate and maneuver the sprayer in a consistent manner unless the can remains in an upright position. Additionally, aerosol cans typically facilitate the release of volatile organic compounds upon their use, which can lead to environmental pollution as these volatile compounds interact with the compounds in environmental air.

One approach for spraying systems for aerosol replacement utilizes a fluid cartridge that holds a volume of paint. However, such systems come with significant disadvantages, such as requiring manual refilling of the cartridge upon paint depletion. Additionally, these systems are typically prone to clogging over time, and require a thorough and dedicated cleaning protocol. For example, to clean these spraying systems, an operator often needs to disconnect the various components of the spraying system and wash them with water in order to prevent paint drying and/or clogging. Further, systems that rely on manual user refilling are susceptible to spilling and extensive user clean up.

The present disclosure is generally directed to a system that provides a user with a consistent means of spraying a surface of interest, while preserving operating conditions and allowing for a convenient means of resupplying the paint source. Additionally, the present disclosure is directed to a system having a convenient means of replacing a paint cartridge without the need for additional system maintenance and/or cleaning.

Figure 1:
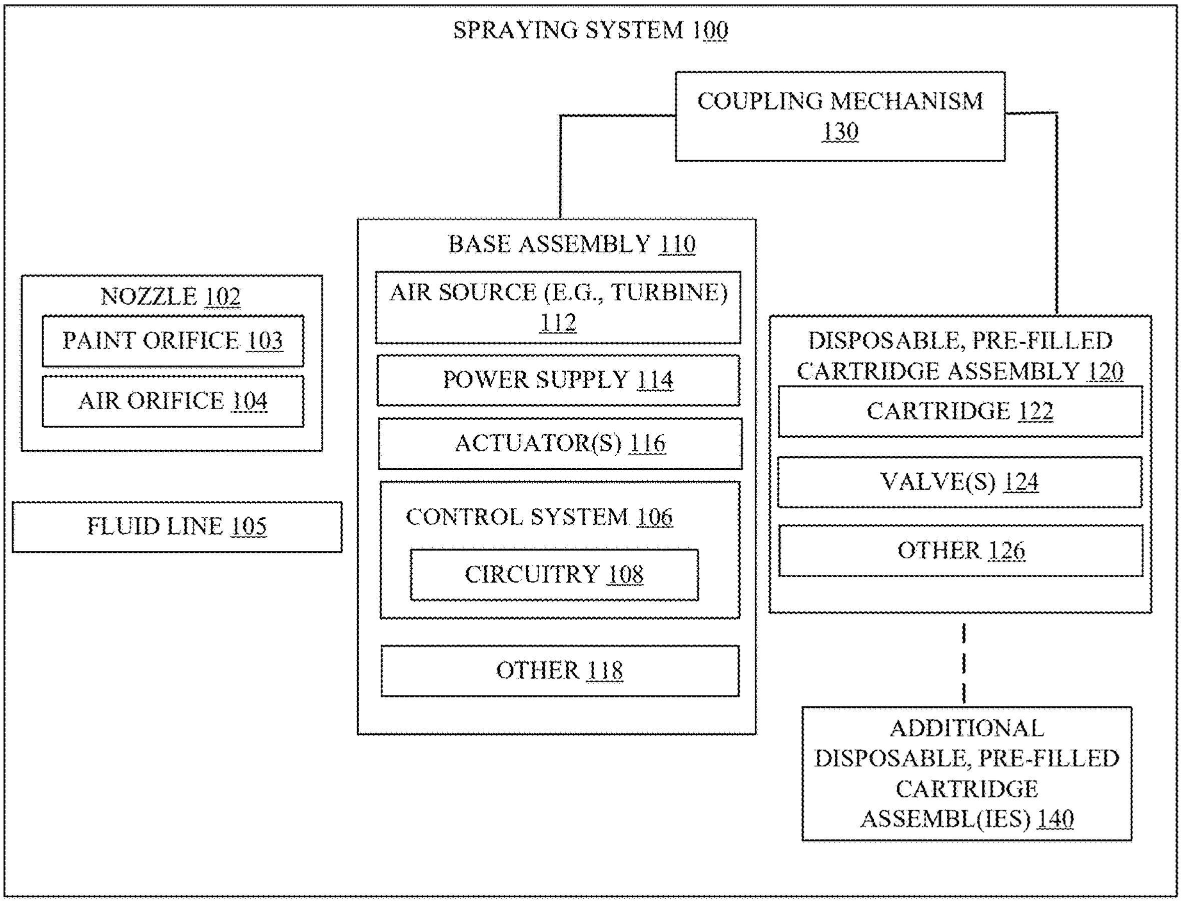
FIG. 1 is a schematic block diagram showing one example of an air-driven spraying system.

FIG. 1 is a schematic block diagram showing one example of a spraying system 100. Spraying system 100 illustratively includes a nozzle 102 having one or more paint orifices 103 configured to allow a flow of paint therethrough. Nozzle 102 also includes one or more air orifices 104 configured to release air flow that propels the paint released from paint orifice(s) 103. Spraying system 100 further includes a fluid line 105, which is configured to supply paint from a source (e.g., cartridge 122 of cartridge assembly 120) to be emitted from nozzle 102. In one example, the fluid line 105 is formed through portions of a base assembly 110 and a cartridge assembly 120.

Spraying system 100 also illustratively includes a control system 106 configured to control one or more subsystems within base assembly 110. Control system 106 includes circuitry 108 configured to electrically couple the various electrical components of spraying system 100. The subsystems of base assembly 110 that can be controlled by control system 106 can include, for example, air source 112 and power supply 114. Air source 112, illustratively a turbine, is configured to generate airflow by drawing air into spraying system 100 in order to pressurize spraying system 100 and facilitate fluid flow out of nozzle 102 by air orifice 114. In one example, air source 112 is driven by a voltage of about 6 volts (V). However, in other examples, a different voltage can be applied to air source 112. Power supply 114 is configured to power the electrical components of spraying system 100, such as air source 112. In one example, power supply 114 can include one or more batteries. The use of one or more batteries as power supply 114 allows for spraying system 100 to be in a wireless configuration. However, it is expressly contemplated that different power supplies can be utilized as well. As shown, air source 112, power supply 114, and circuitry 108 are all disposed within a body of base assembly 110. Base assembly 110 can also include one or more actuators 116 configured to control the flow of paint through fluid line 105 and to the nozzle 102. Additionally, base assembly 110 can include other items as well, as indicated by block 118.

Spraying system 100 also includes a disposable, pre-filled cartridge assembly 120. As further detailed below, cartridge assembly 120 can be removably coupled to base assembly 110 via coupling mechanism 130. Examples of cartridge assembly 120 are described in greater detail below. Briefly, however, cartridge assembly 120 includes a cartridge 122 and one or more valves 124. Additionally, cartridge assembly 120 can include other items as well, as indicated by block 126. Cartridge 122 is configured to hold a volume of paint and can be implemented in various configurations. For instance, cartridge 122 can be a rigid fluid reservoir. In another example, cartridge 122 can include a rigid housing and a compressible reservoir interior. By utilizing a compressible reservoir interior, the interior can compress in response to the pressurized environment created by air source 112 to cause the paint to exit through fluid line 105, while also preventing air in cartridge 122 from mixing with the paint therein. In another example, an elastomeric liner can be disposed in cartridge 122 and configured to receive air from air source 112 and expand, thereby forcing paint out of cartridge 122 relative to the level which the elastomeric liner has been filled. Additionally, it is expressly contemplated that cartridge 122 can be in a different configuration capable of holding a volume of paint as well.

Valve 124 is coupled to fluid line 105 and is configured to control the flow of paint from cartridge 122. Specifically, upon coupling cartridge assembly 120 to base assembly 110 via coupling mechanism 130, valve 124 is coupled to actuator 116 and configured to, upon actuation of the actuator, move to an open position to drive the paint from the cartridge. Additionally, upon release of actuator 116, or when cartridge assembly 120 is not in use, valve 124 is configured to move to a closed position and prevent fluid flow. In one example, valve 124 is a needle valve, as described in more detail below. However, it is expressly contemplated that valve 124 can be a different type of valve as well, such as a duck-bill valve.

In operation, cartridge 122 is configured to receive air pressure from air source 112, which pressurizes cartridge 122 and causes paint to exit through fluid line 105 upon opening of valve 124. The air pressure in cartridge 122 is sufficient to overcome gravity and any capillary resistance in the fluid line. In one example, air source 112 pressurizes cartridge at approximately one pound per square inch (PSI). In one example, paint can exit cartridge 122 by utilizing the venturi effect, whereby paint is drawn from cartridge 122 without the need to positively pressurize cartridge 122.

As noted above, cartridge assembly 120 is disposable and pre-filled. Specifically, cartridge 122 is pre-filled with paint and can be removably coupled to base assembly 110 for the spraying operation. In operation, a user can replace cartridge assembly 120 with an additional cartridge assembly, as indicated by block 140. For example, if the pre-filled cartridge 122 has been depleted and/or the user desires to change the paint (e.g., changing colors to spray), the user can conveniently replace cartridge assembly 120 with an additional cartridge assembly 140 (which can include similar components, but filled with a different paint), thus removing the need for cleaning of the valve and/or manual filling of cartridge 122. Cartridge assembly 140 can be replaced with any number of additional cartridge assemblies 140 (such as by the user acquiring any of a number of available off-the-shelf prefilled cartridge assemblies).

Figure 2A:
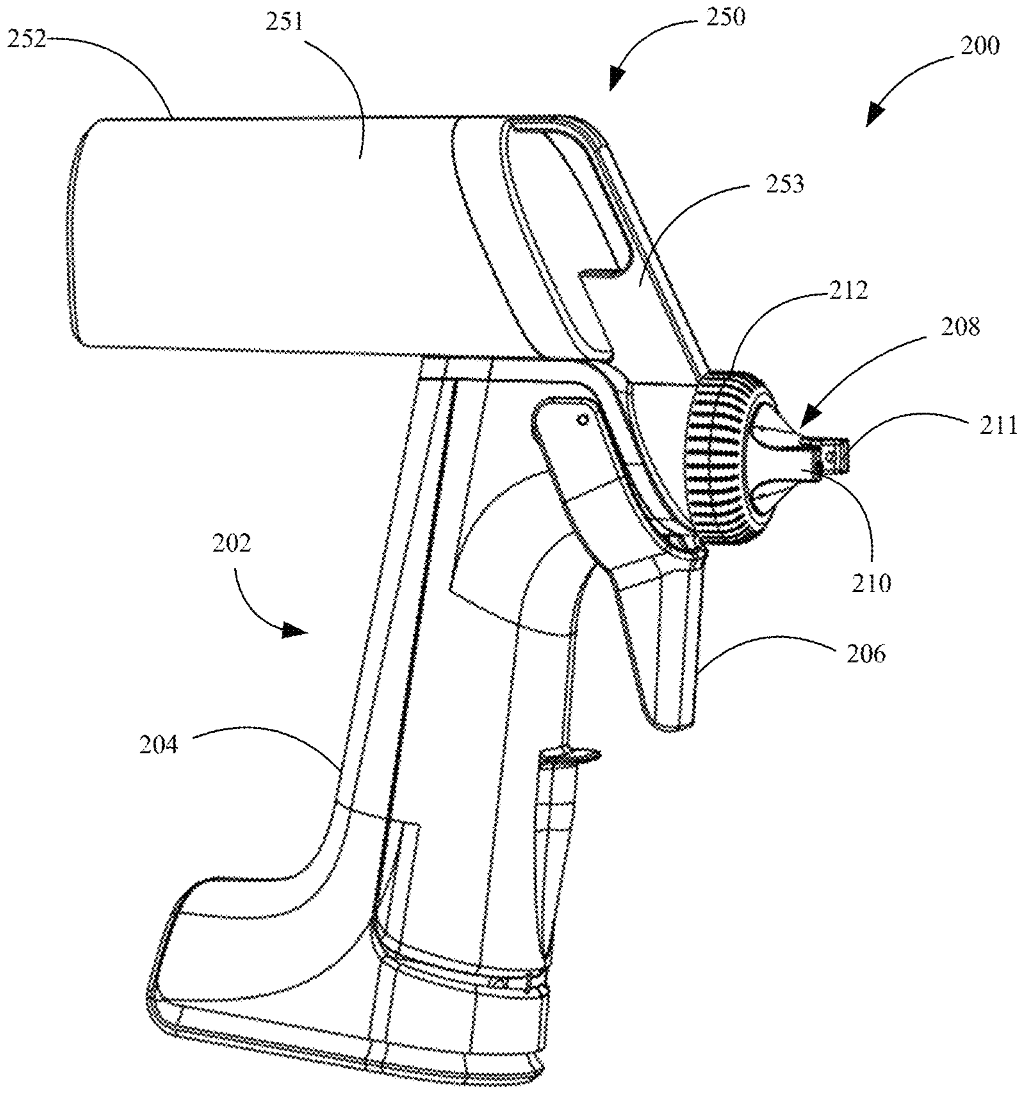
FIGS. 2A-2F (collectively referred to as FIG. 2) are diagrammatic views showing one example of a fluid sprayer.
Figure 2B:
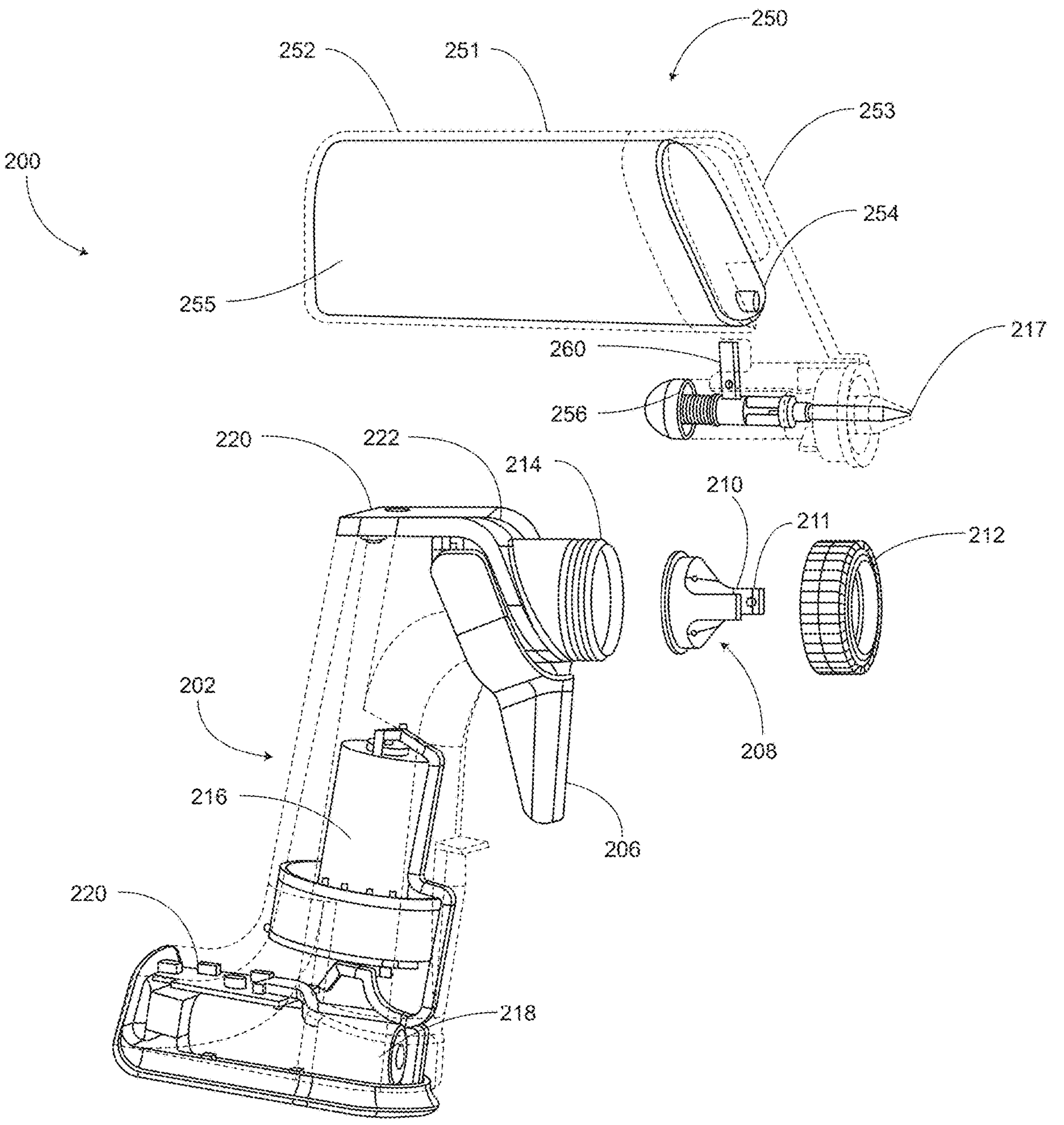
Figure 2C:
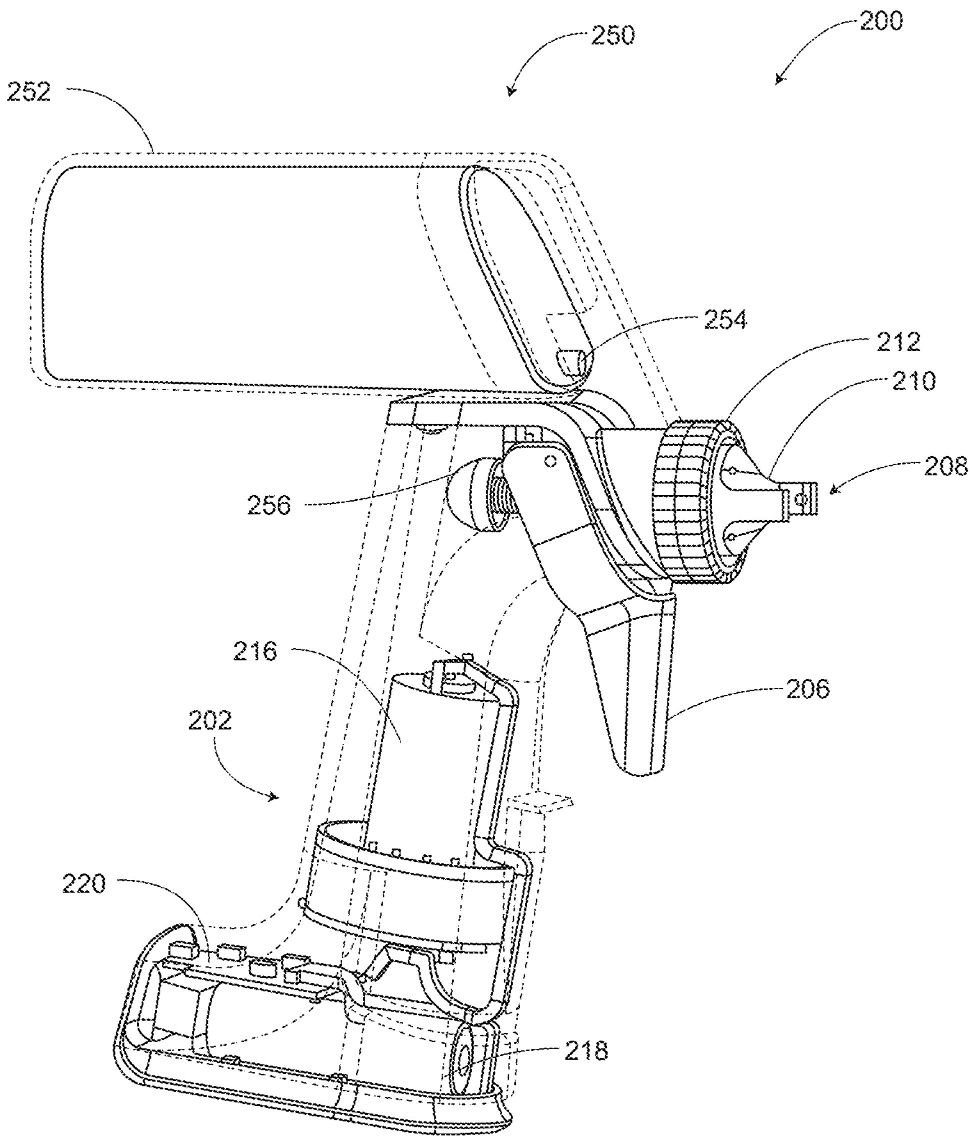
Figure 2D:
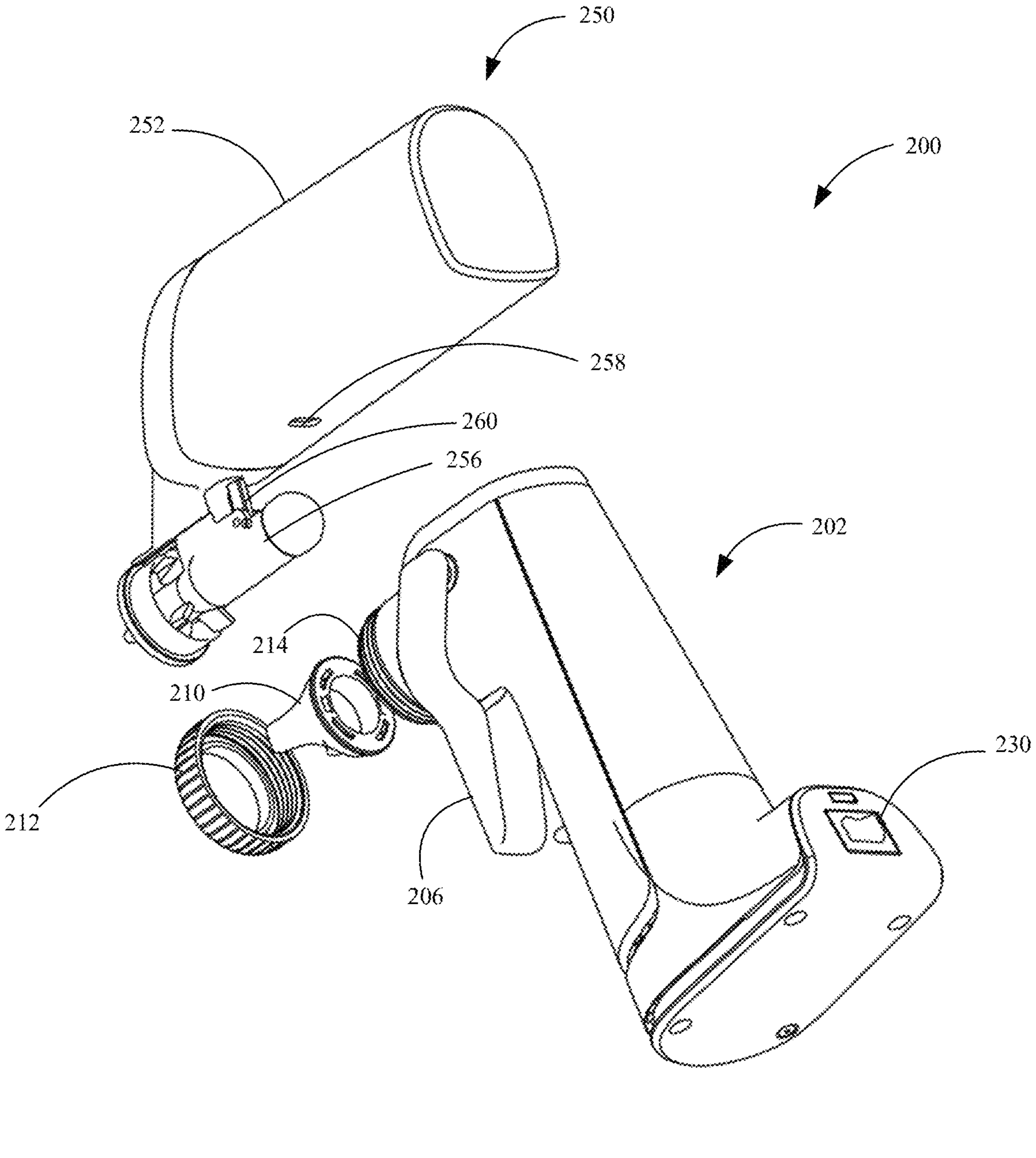
Figure 2E:
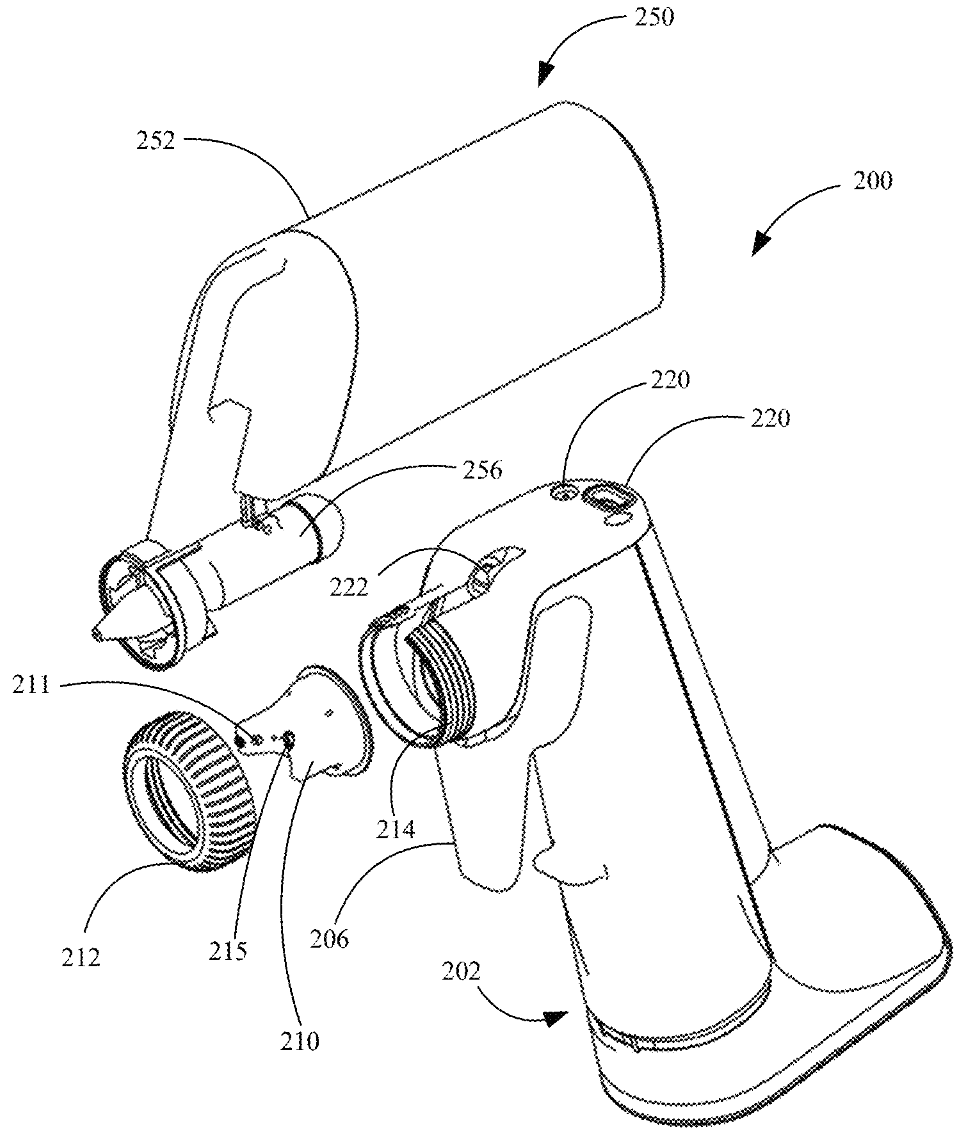
Figure 2F:
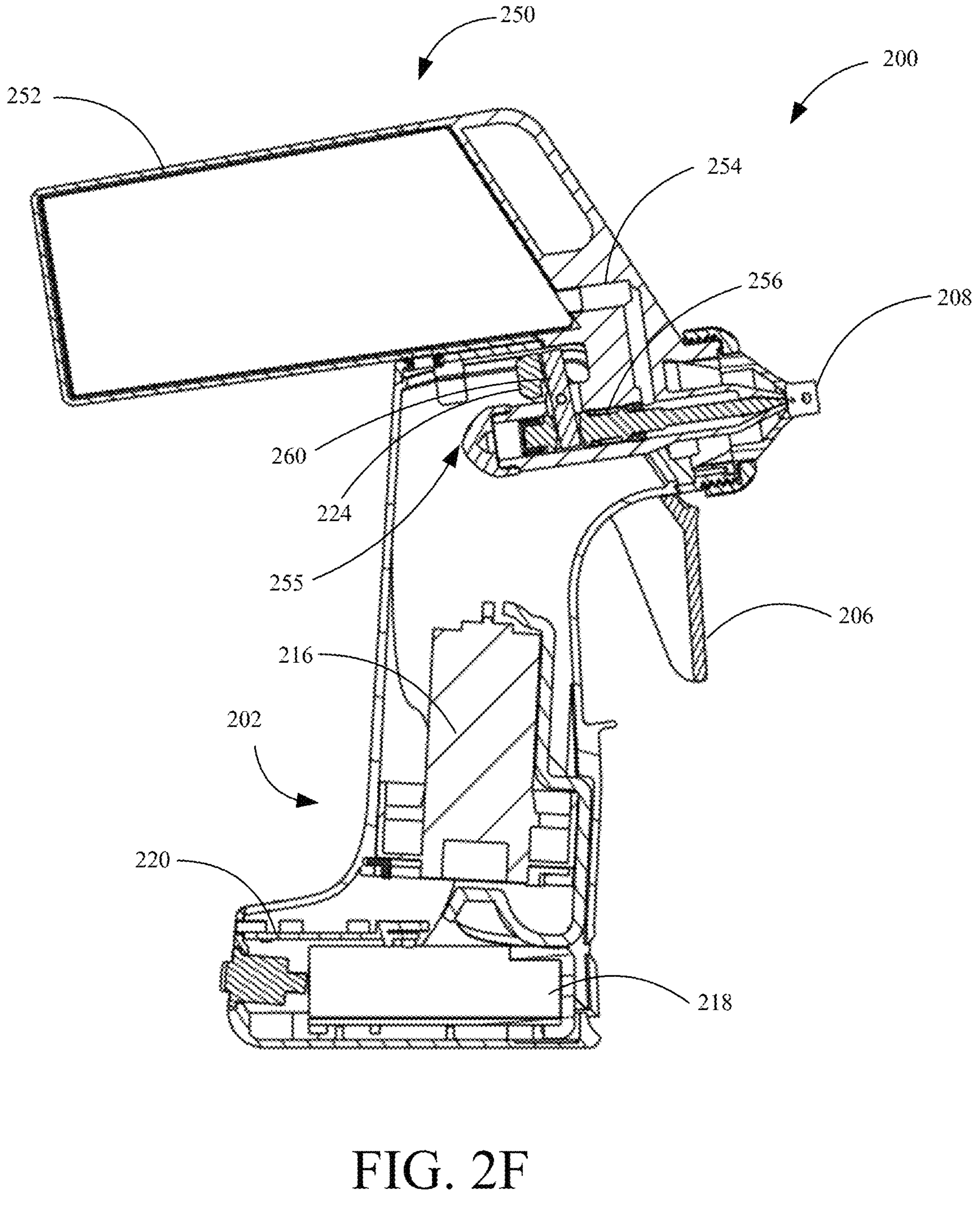

FIGS. 2A-2F (collectively referred to as FIG. 2) are diagrammatic views showing an example handheld fluid sprayer. Sprayer 200 illustratively includes base assembly 202 and cartridge assembly 250. In some examples, cartridge assembly 250 is removably couplable to base assembly 202. FIG. 2A shows base assembly 202 coupled to cartridge assembly 250 and FIG. 2B shows cartridge assembly 250 is removed from base assembly 202. FIG. 2B shows portions of sprayer 200 in phantom for illustration purposes.

As shown in FIG. 2, base assembly 202 includes body 204, which houses electrical and mechanical components of sprayer 200 therein. For example, body 204 can house air source 216, power supply 218, and circuitry 220. Base assembly 202 also includes an actuator or trigger 206, which is configured to control flow of the paint housed within cartridge assembly 250 to nozzle 208. Additionally, nozzle 208 can include a tip guard 210 having a distal portion including air orifices 211. Nozzle 208 is secured to sprayer 200 by coupling mechanism 212. In one example, coupling mechanism 212 is a fastener (e.g., a threaded fastener, as shown in FIG. 2B), that is secured to sprayer 200 by a threaded portion 214. However, in other examples, a different type of fastener can be utilized as well, such as a clip-on fastener. Fastener 212 also secures cartridge assembly 250 to base assembly 202.

As noted above, base assembly 202 illustratively includes air source 216, power supply 218, and circuitry 220 disposed within body 204. Air source 216 is configured to draw air into sprayer 200 in order to pressurize cartridge assembly 250 and atomize the paint to facilitate fluid flow out of nozzle 208. In one example, air source 216 can include an electric motor configured to drive an air pump. Specifically, as shown in FIG. 2, the air pump can include a turbine. However, in another example, the air pump can include an air compressor.

Power supply 218 is disposed near the distal end of body 204 and is configured to supply power to air source 216 upon actuation of power switch 230, which causes pressurizing of cartridge 252 and the release of air from nozzle 208, regardless of the position of actuator 206. By disposing power supply 218 near the distal end of body 204, a user can easily and conveniently access and/or replace power supply 218 when desired. For instance, power supply 218 can be a plurality of disposable batteries, in which a user is required to change the batteries upon depletion. In another example, power supply 218 can be a rechargeable battery that needs to be recharged upon power depletion. Circuitry 220 is disposed adjacent to power supply 218 and is configured to electrically couple power supply 218 to the electrical components of sprayer 200, such as air source 216.

Cartridge assembly 250 is configured to couple to base assembly 202 prior to operation of spraying system 200. As noted above, cartridge assembly 250 is removably couplable to base assembly 202. That is, cartridge assembly 250 can be removed and/or replaced with a new cartridge assembly when desired. Additionally, as noted above, cartridge assembly 250 can be a disposable, pre-filled cartridge assembly. For example, when cartridge assembly 250 has been depleted, a user can conveniently replace cartridge assembly 250 with a new cartridge assembly, thus removing the need for cleaning of the valve and/or manual filling of the cartridge. One example of cartridge assembly 250 is described detail with respect to FIG. 9.

Briefly, however, cartridge assembly 250 illustratively includes cartridge 252, a channel 254, and a valve assembly 255 having a valve 256 (illustratively a needle valve). As shown, cartridge 252 includes a rigid cartridge housing 251 that houses a compressible member 255 (e.g., a polymeric liner) that stores the paint. Cartridge housing 251 is coupled to cartridge assembly body 253. Valve assembly 255 is also coupled to cartridge assembly body 253 and configured to control the flow of paint from cartridge 252 through channel 254.

Cartridge assembly 250 also includes pressure inlet 258 (shown in FIG. 2D), which is configured to receive a portion of airflow from air source 216 to pressurize cartridge 252. By pressurizing cartridge 252, paint is drawn outwards from cartridge 252, through channel 254. Actuation (opening and closing) of valve 256 controls the flow of paint through nozzle 208.

Pressure inlet 258 is configured to receive a portion of airflow from pressure outlet 220 (shown in FIG. 2E) disposed on base assembly 202. Accordingly, air source 216 is configured to provide a first portion of airflow to cartridge assembly 250 to pressurize cartridge 252, and a second portion of airflow to nozzle 208. Nozzle 208 includes at least one paint orifice 215 (e.g., paint orifice 103) that allows the flow of paint therethrough. Air orifices 211 are configured to release the air flow from air source 216 to propel the paint released from the paint orifice.

As shown, cartridge 252 is a fixed and integral portion of cartridge assembly 250. Specifically, cartridge housing 251 containing the paint reservoir is fixed to the assembly body 253 such that housing 251 cannot be removed from and/or rotated about cartridge assembly body 251 by hand. This discourages, if not prevents, the user from removing the cartridge housing, and is accomplished in the illustrated example due, at least in part, to the non-circular structure of cartridge 252. Alternative, or in addition, the cartridge housing 251 can be secured to body 253 by adhering the housing 251 to body 253.

In another example, such as when cartridge 252 is circular, rotation prevention can be accomplished by utilizing a latching mechanism, in which cartridge 252 can include protrusions (not shown) that latch to corresponding inlets 240 on base assembly 202. Additionally, cartridge 252 is configured such that cartridge 252 does not move laterally or longitudinally from an external force. By integrating cartridge 252 to be fixed and irremovable from cartridge assembly 250, a user is prevented from manually re-filling cartridge 252, which could otherwise cause paint spillage and/or functional malfunctions to valve 256. Additionally, by preventing cartridge 252 from being rotatable, movable, and/or removable relative to cartridge assembly 250, pressure inlet 258 remains aligned with pressure outlet 220.

Additionally, valve assembly 255 is also a fixed and integral portion of cartridge assembly 250. In operation, a user can replace cartridge assembly 250 with a new cartridge assembly when desired. For example, if the paint pre-filled within cartridge 252 has been depleted, a user can conveniently replace cartridge assembly 250 with a new cartridge assembly. By having valve assembly 255 as an irremovable and integral portion of cartridge assembly 250, valve assembly 255 is also replaced when cartridge assembly 250 is replaced with a different cartridge assembly, thus removing the need for cleaning and/or maintenance of valve assembly 255. For example, the need to unclog or otherwise clean valve assembly 255 from dried paint accumulated during a spraying operation is minimized and/or eliminated. Additionally, the need to clean the valve and/or other portions of the fluid pathway when switching between paint colors or paint types is eliminated.

Valve assembly 255 includes a linkage 260. Linkage 260 is configured to mechanically link valve assembly 255 of cartridge assembly 250 to base assembly 202. In the example shown in FIG. 2, linkage 260 is received in slot 222 of base assembly 202 and is configured to mechanically link valve 256 to actuator 206. Cartridge assembly 250 can then be secured to base assembly 202 by fastener 212. In one example, linkage 260 is coupled to cartridge assembly 250 and is removed upon removal of cartridge assembly 250 with a second cartridge assembly.

In one example, after linkage 260 has been aligned within slot 222 to mechanically link cartridge assembly 250 to base assembly 202, the user can actuate actuator 206 to drive mechanical portion 224 (shown in FIG. 2F) of actuator 206 in a direction that causes linkage 260 to rotate in a clockwise direction (in FIG. 2F), which in turn pulls valve 256 away from a sealing engagement with a valve seal 217, which is illustratively formed by a surface of cartridge assembly 250. In another example, a valve seal can be formed by the interface of valve 256 and nozzle 208.

In this way, mechanical portion 224 can be mechanically linked to valve 256 by linkage 260. In one example operation, upon actuating actuator 206 to cause mechanical portion 224 to drive rotation of linkage 260, valve 256 moves to an open position. Because cartridge 252 is pressurized by air source 216 when sprayer 200 is powered on, paint is then directed out of cartridge 252 through channel 254 and towards valve 256. Additionally, because a portion of the airflow from air source 216 is also directed towards nozzle 208, the paint can be atomized and emitted from the nozzle.

Upon releasing actuator 206, mechanical portion 224 translates in a reverse direction to cause linkage 260 to rotate in a counterclockwise direction, thereby returning valve 256 to its closed position. In one example, a biasing member, such as a spring, and utilized to bias the valve 256 to the closed position.

Additionally, it is expressly contemplated that a linkage different from linkage 260 can be utilized to link actuator 206 to cartridge assembly 250. For example, rather than utilizing linkage 260, actuator 206 can be linked to cartridge assembly 250 by a clip-on mechanism disposed on or otherwise coupled to valve 256. In this way, actuator 206 can be mechanically linked to valve 256 upon securing cartridge assembly 250 to base assembly 202 via coupling mechanism 212. In operation, upon actuating actuator 206, the clip-on mechanism can cause valve 256 to move to an open position to drive the paint from cartridge assembly 250. In another example, in lieu of utilizing linkage 260, a compression mechanism can be utilized that mechanically links actuator 206 to valve 256, in which actuator 206 has a mechanical portion that compresses around valve 256 and causes valve 256 to move to an open position upon actuation of actuator 206. Additionally, it is expressly contemplated that other ways of mechanically linking actuator 206 to cartridge assembly 250 can be utilized as well.

Figure 3:
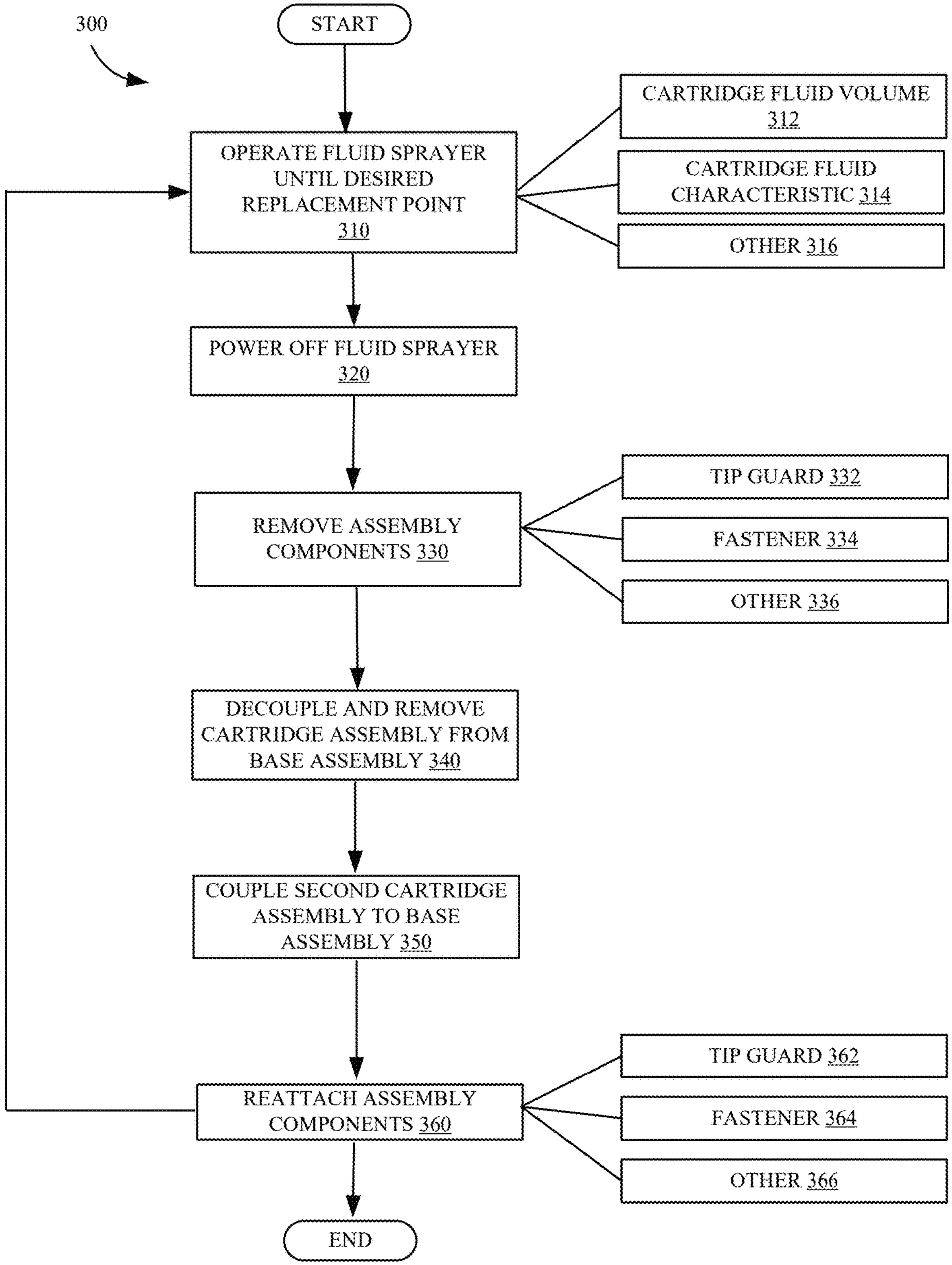
FIG. 3 is a flow diagram showing an example operation of removing and replacing a cartridge assembly.

FIG. 3 is a flow diagram showing an example operation of removing and replacing a cartridge assembly. For sake of illustration, but not by limitation, FIG. 3 will be described in the context of fluid sprayer 200.

Operation 300 begins at block 310 where fluid sprayer 200 is operated until a desired replacement point has been met. Operation of the fluid sprayer can include, for example, operating fluid sprayer 200 as described above with respect to FIG. 2 by actuating actuator 206 to cause paint to be emitted from the spray tip. As indicated by block 312, the desired replacement point can be based on cartridge paint volume. For example, if the pre-filled cartridge is at or near its paint depletion point, the cartridge can be replaced with a new, pre-filled cartridge. The pre-filled cartridge can be, for example, cartridge 252 described above with respect to FIG. 2. As indicated by block 314, the desired replacement point can also be based on one or more cartridge fluid characteristics. For example, if a new color of paint is desired, the cartridge can be replaced with a new, pre-filled cartridge having paint of the desired color. Additionally, it is expressly contemplated that cartridge assembly replacement can be based on a different replacement point as well, as indicated by block 316.

Operation 300 proceeds at block 320 where the fluid sprayer is powered off. The fluid sprayer can be powered off by, for example, utilizing power switch 230, described above. Additionally, it is expressly contemplated that the fluid sprayer can be turned off in other ways as well, such as by pressing a power button, disconnecting the power supply (e.g., power supply 218), etc.

Operation 300 proceeds at block 330 where some assembly components of the handheld fluid sprayer are removed. For example, as indicated by block 332, a tip guard (e.g., tip guard 210) can be removed from the base assembly. As indicated by block 334, a fastener (e.g., fastener 212) can be removed as well. In one example, as noted above with respect to FIG. 2, the fastener is configured to secure both the tip guard and cartridge assembly (e.g., cartridge assembly 250) to the base assembly (e.g., base assembly 202). Accordingly, by removing the fastener from the handheld fluid sprayer, the cartridge assembly can be removed from the base assembly.

Operation 300 proceeds at block 340 where the cartridge assembly is decoupled and removed from the base assembly. As noted above with respect to FIG. 2, the cartridge assembly is removably coupled to the base assembly by fastener 212, and mechanically linked to the base assembly by, for example, a linkage. As indicated above with respect to FIG. 2, the sprayer valve is coupled to the cartridge assembly. Accordingly, by decoupling the cartridge assembly from the base assembly, the cartridge assembly containing the cartridge and the valve can be removed as one unit.

Operation 300 proceeds at block 350 where a second cartridge assembly is coupled to the base assembly. As noted above, each cartridge assembly contains a pre-filled cartridge and a valve. Accordingly, by coupling a new second cartridge assembly to the base assembly, a new pre-filled cartridge and valve can be utilized in subsequent spraying operations, thus minimizing and/or removing the need for cleaning of the valve and/or manual filling of the cartridge. In one example, as described above with respect to FIG. 2, recoupling the cartridge assembly to the base assembly includes aligning a linkage within a slot on the base assembly (e.g., slot 222) such that the actuator disposed on the base assembly can cause the valve to open.

Operation 300 proceeds at block 360 where the removed assembly components of the fluid sprayer are reattached. For example, as indicated by block 362, the tip guard can be reattached. Additionally, as indicated by block 364, the fastener can be reattached. In one example, reattaching the fastener threadably secures the cartridge assembly to the base assembly. Additionally, it is expressly contemplated that other assembly components can be reattached to the fluid sprayer as well, as indicated by block 366.

After reassembly of the fluid sprayer, the operation can be repeated at block 310 where the fluid sprayer is operated until a new replacement point is met. The operation can repeat at block 360 any number of times until the spraying operation has been completed.

Figure 4A:
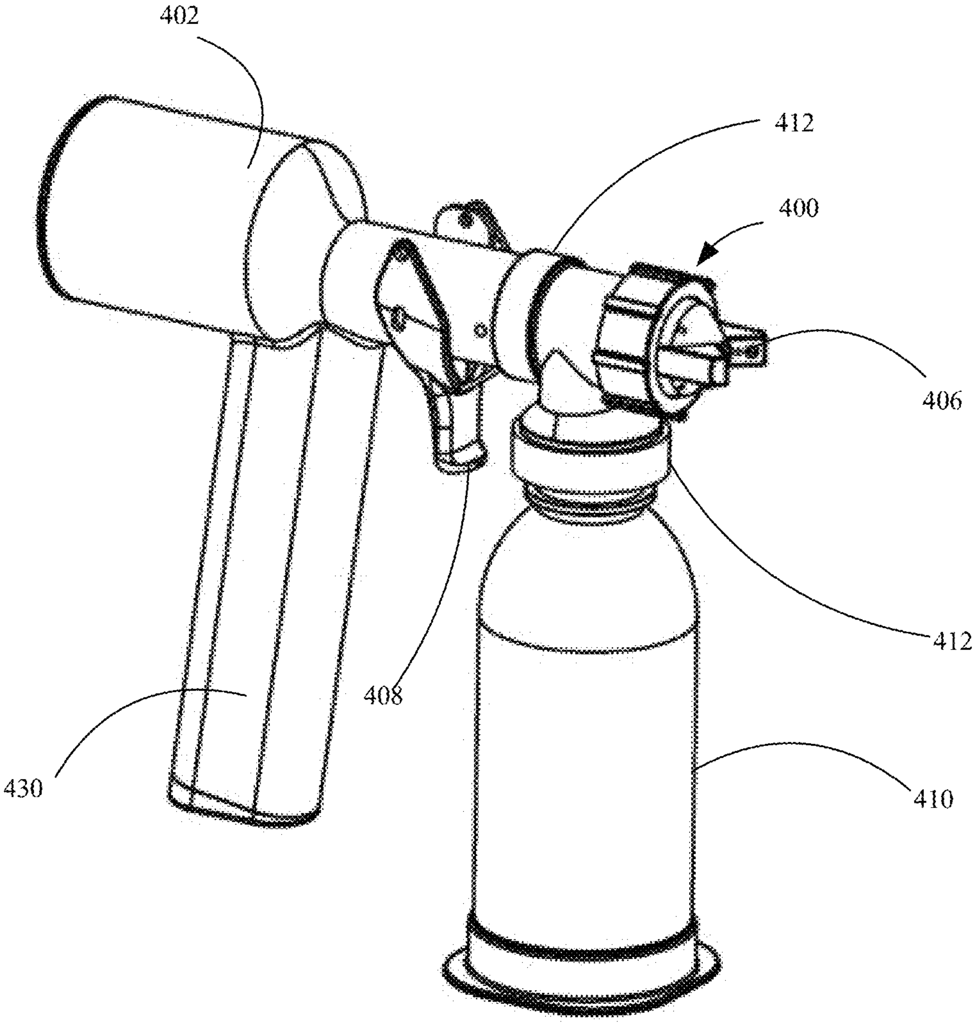
FIGS. 4A-4C (collectively referred to as FIG. 4) are diagrammatic views showing another example of a fluid sprayer.
Figure 4B:
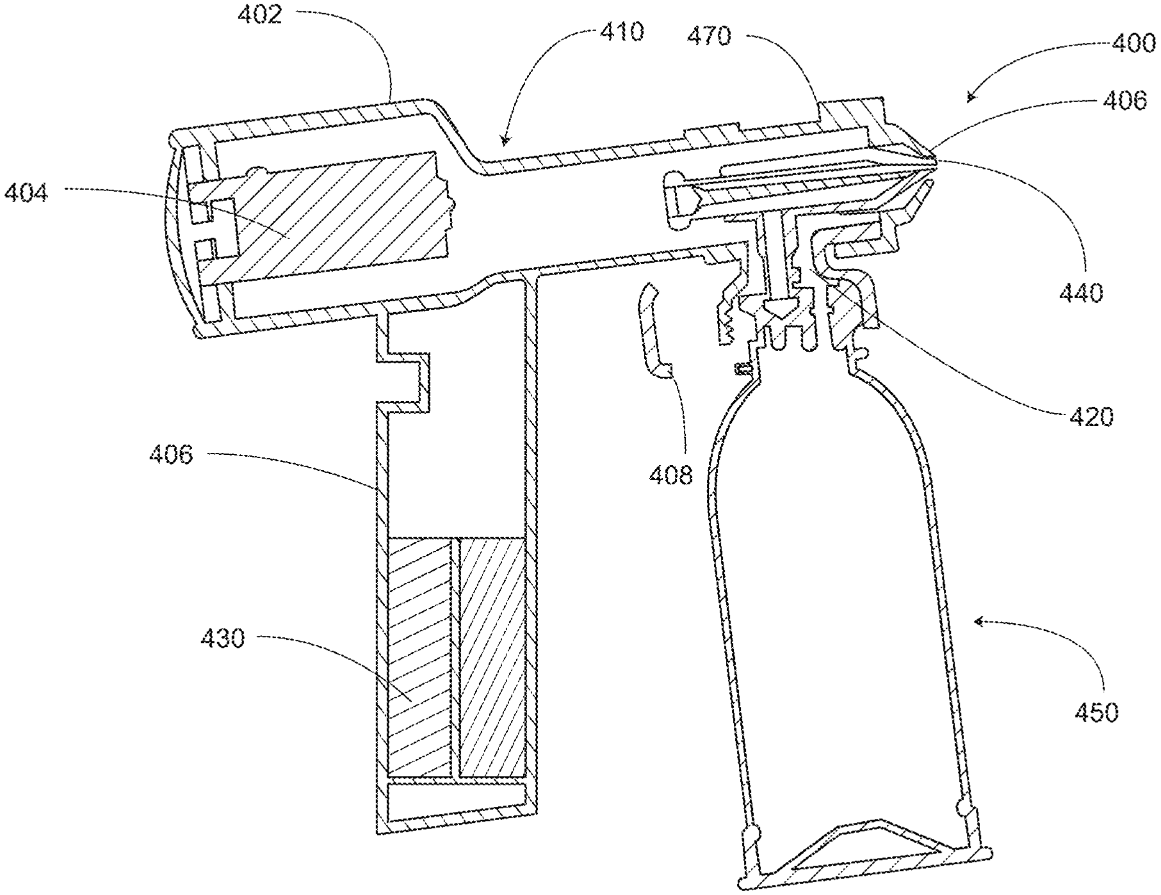
Figure 4C:
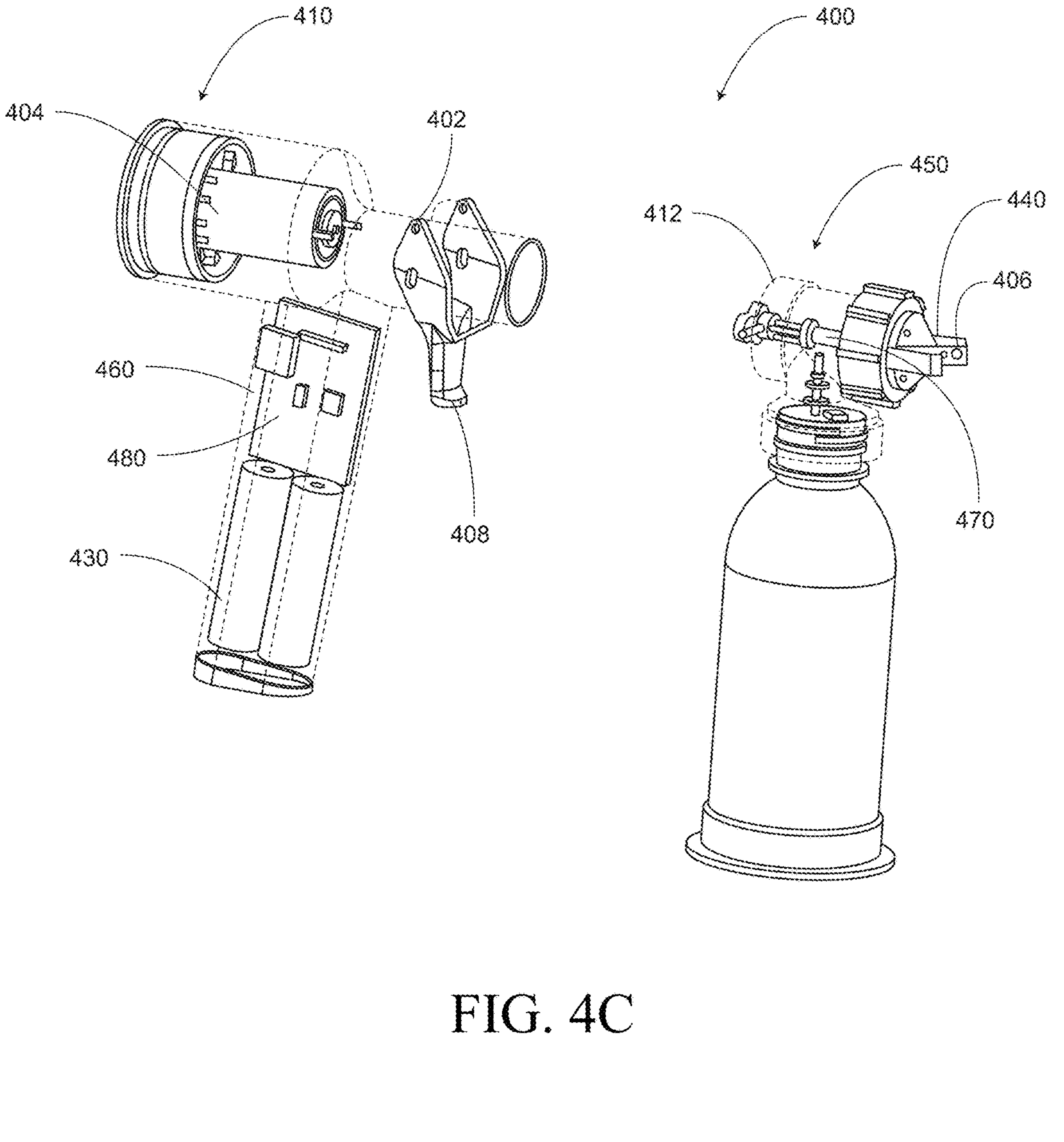

FIGS. 4A-4C (collectively referred to as FIG. 4) are diagrammatic views showing another example of a fluid sprayer 400. Sprayer 400 illustratively includes body 402, which is configured to house circuitry 480 and an air source 404. The air source can be, for example, a turbine. Air source 404 is configured to draw air into sprayer 400 in order to atomize the paint and facilitate fluid flow out of spray tip 406. Spray tip 406 further includes a tip nozzle 440 configured to allow fluid flow through spray tip 406 upon actuation by actuator 408.

Sprayer 400 additionally includes handle 460 having power supply 430. As illustrated, power supply 430 includes one or more batteries. The batteries can be, in one example, disposable batteries. However, in another example, power supply 430 can be rechargeable, in which a user can detach the handle 430 in order to recharge the batteries disposed therein. The rechargeable power supply can be, in one example, rechargeable by Universal Serial Bus (USB) charging. Additionally, it is expressly contemplated that power supply 430 can be rechargeable in other ways as well.

Sprayer 400 further includes actuator 408, which is configured to couple to and actuate cartridge assembly 450 in a similar manner described above with respect to FIG. 2. As shown, base assembly 410 is secured to cartridge assembly 450 via fastener 412. In one example, fastener 412 is a threaded fastener configured to rotatably couple cartridge assembly 450 to base assembly 410.

In the illustrated example, actuator 408 is a trigger. However, in other examples, other types of actuators can be used as well. In one example operation, a user grips sprayer 400 at handle 430 and/or cartridge assembly 450 and squeezes actuator 408, which causes valve 470 to move to an open position in order to allow fluid flow through fluid line 420 and out of nozzle 440. During operation, air source 404 supplies airflow through base assembly 410 and towards tip 440, thereby pressurizing cartridge assembly 450 and allowing a paint spray to be emitted. As shown, cartridge assembly 450 and power supply (handle) 430 have generally flat bottom surfaces, whereby sprayer 400 can be set by a user in an upright position.

Figure 5A:
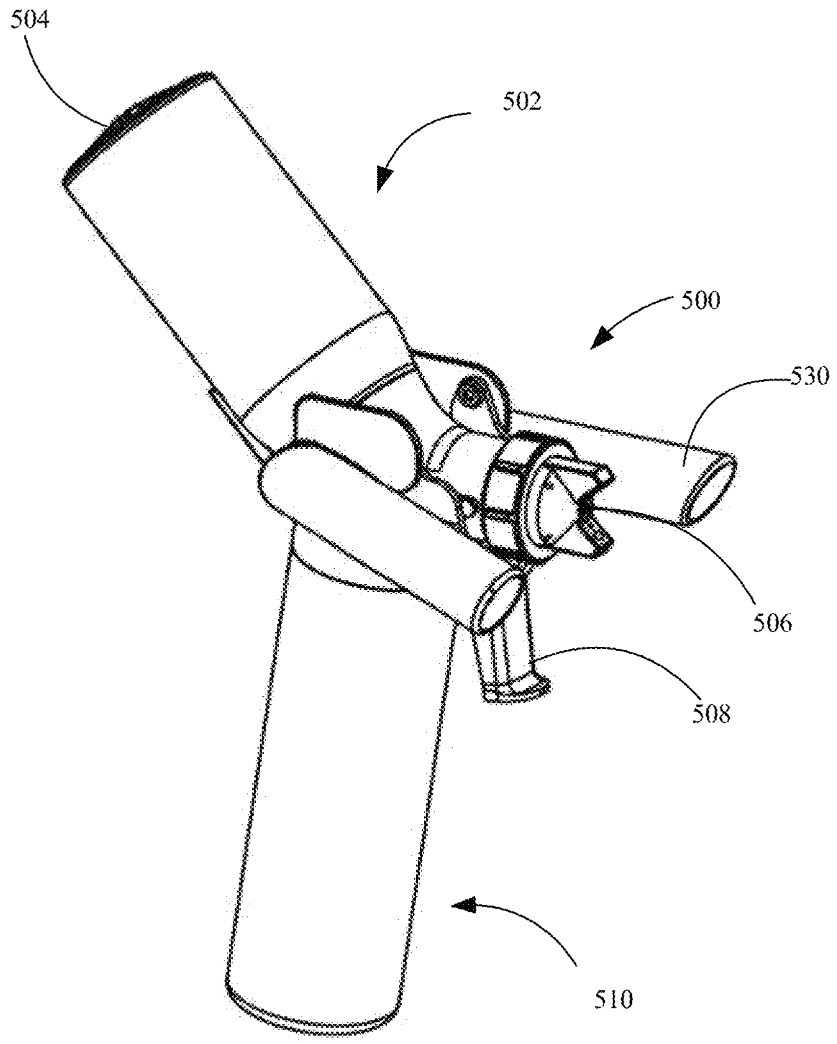
FIGS. 5A-5C (collectively referred to as FIG. 5) are diagrammatic views showing another example of a fluid sprayer.
Figure 5B:
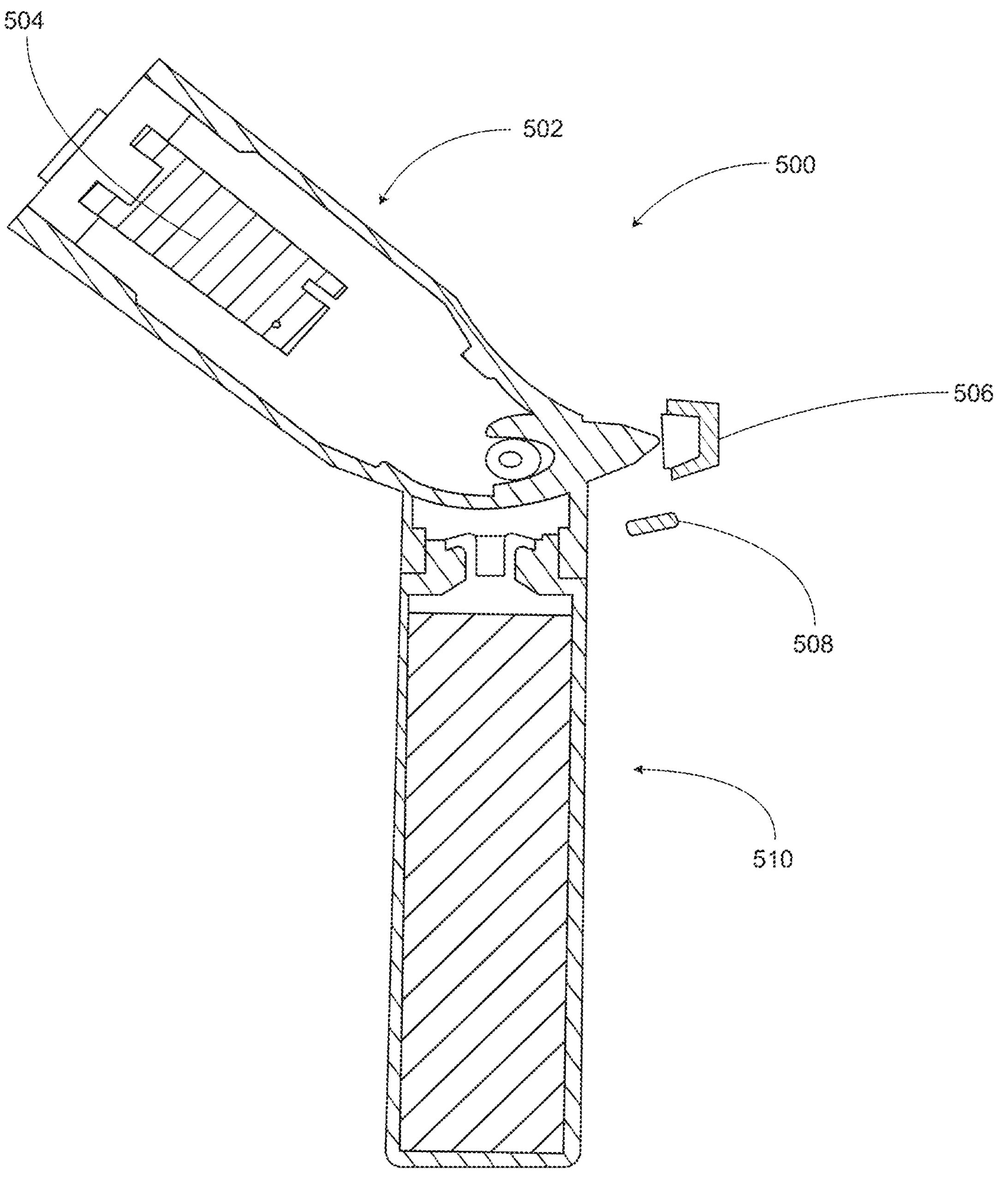
Figure 5C:
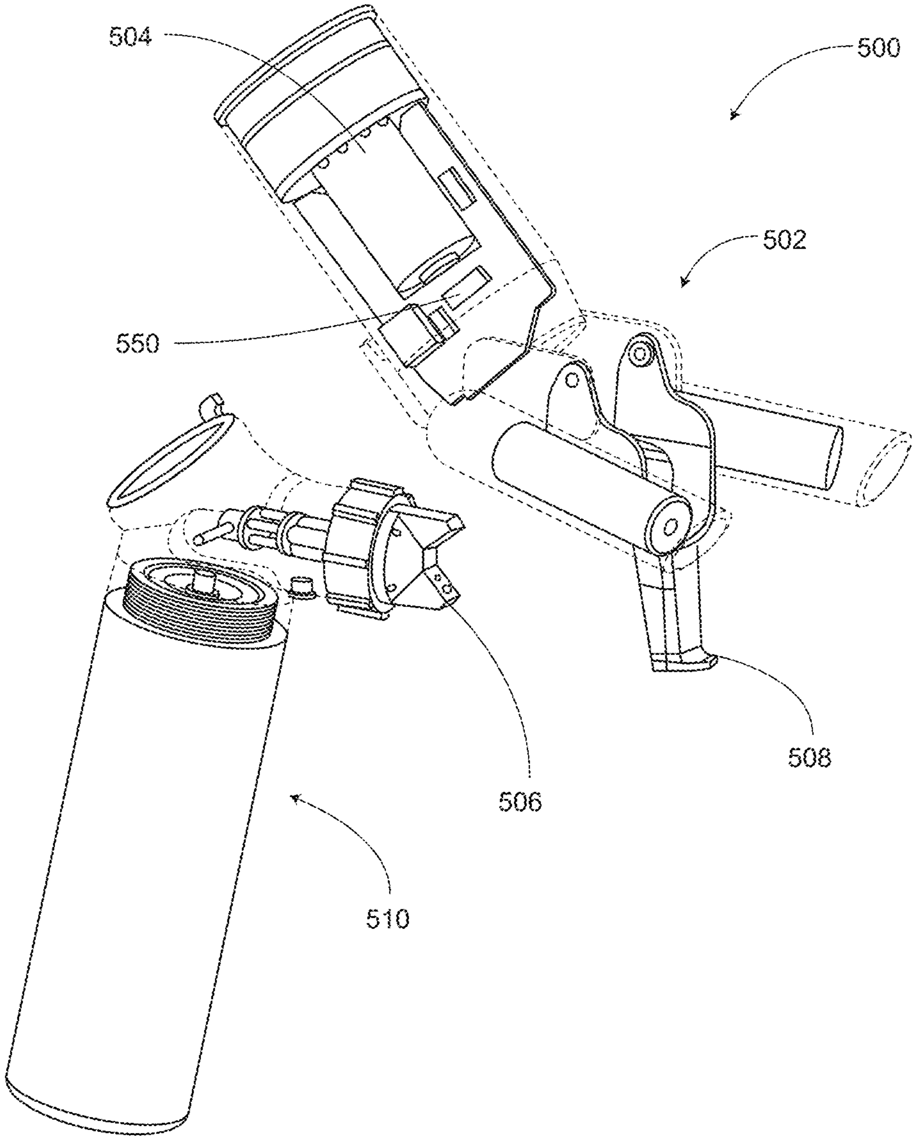

FIGS. 5A-5C (collectively referred to as FIG. 5) are diagrammatic views showing another example of a fluid sprayer 500. Sprayer 500 illustratively includes base assembly 502, which is configured to house air source 504 and circuitry 550. As previously indicated, air source 504 is configured to draw air into sprayer 500 in order to pressurize cartridge assembly 510 to facilitate fluid flow out of spray tip 506. Sprayer 500 additionally includes power supply 530 disposed on an exterior of base assembly 502. As illustrated in FIG. 5, power supply 530 includes a plurality of batteries. However, in other examples, another power supply can be used (e.g., cables, rechargeable batteries, etc.). Power supply 530 is configured to provide power to sprayer 500, and particularly to air source 504.

Sprayer 500 further includes actuator 508, which is configured to couple to cartridge assembly 510 in a similar manner described above with respect to FIG. 2. In the illustrated example, actuator 508 is a trigger. However, in other examples, other types of actuators can be used as well. In one example operation, a user grips cartridge assembly 510 and squeezes actuator 508, which causes the valve of cartridge assembly 510 to move to an open position in the manner described above with respect to FIG. 2, thereby allowing fluid flow through a fluid line (not shown) and out of tip 506. During operation, air source 504 supplies airflow through base assembly 502 and towards cartridge assembly 510 and tip 506, thus allowing a paint spray to be emitted.

Figure 6A:
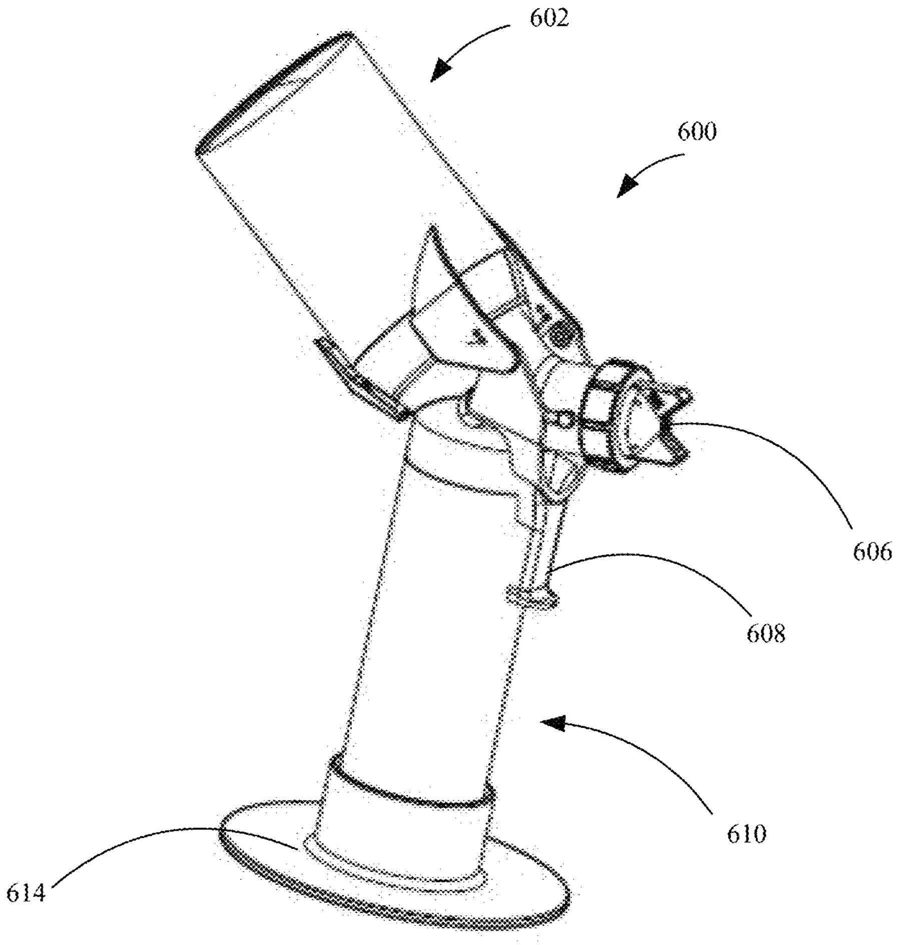
FIGS. 6A-6C (collectively referred to as FIG. 6) are diagrammatic views showing another example of a fluid sprayer.
Figure 6B:
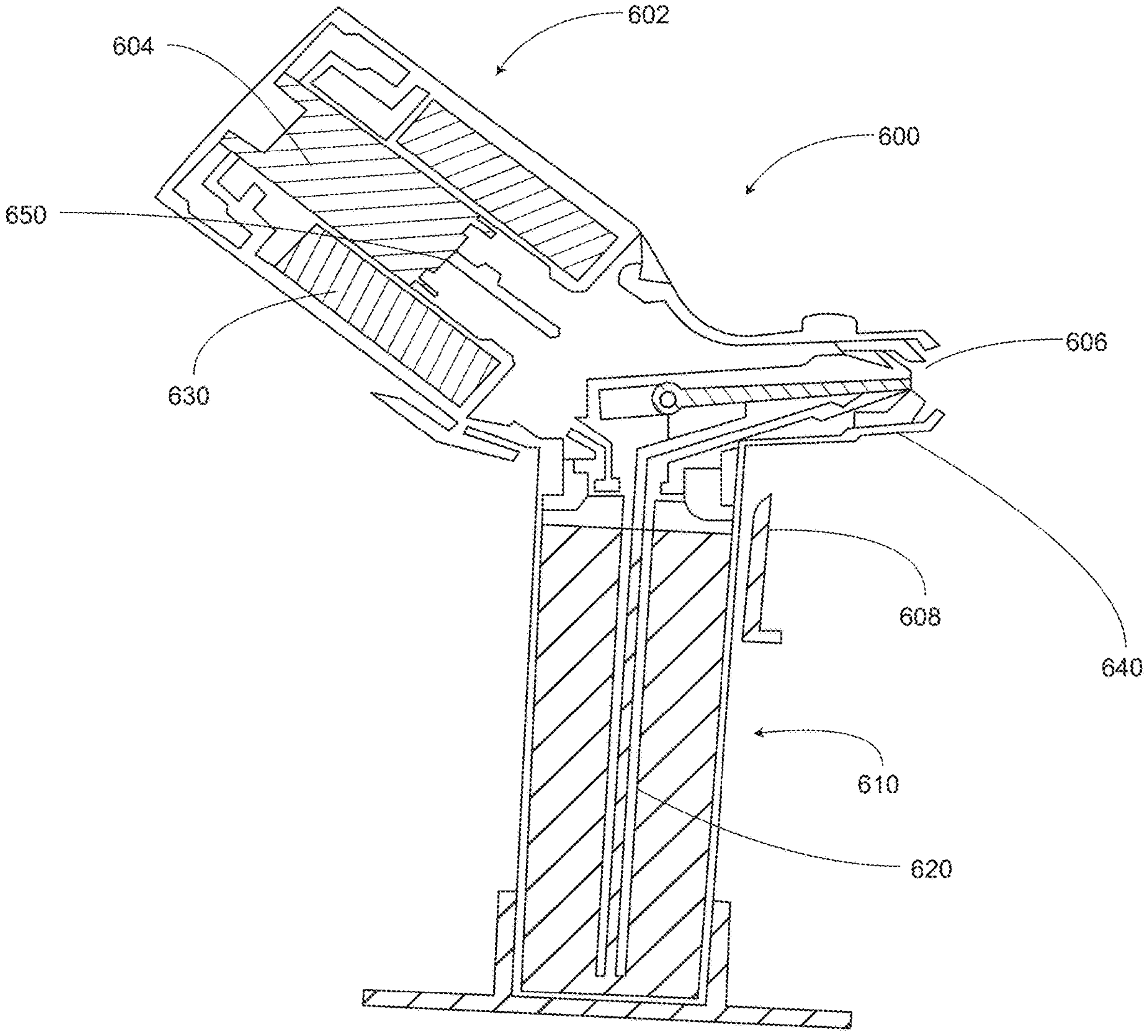
Figure 6C:
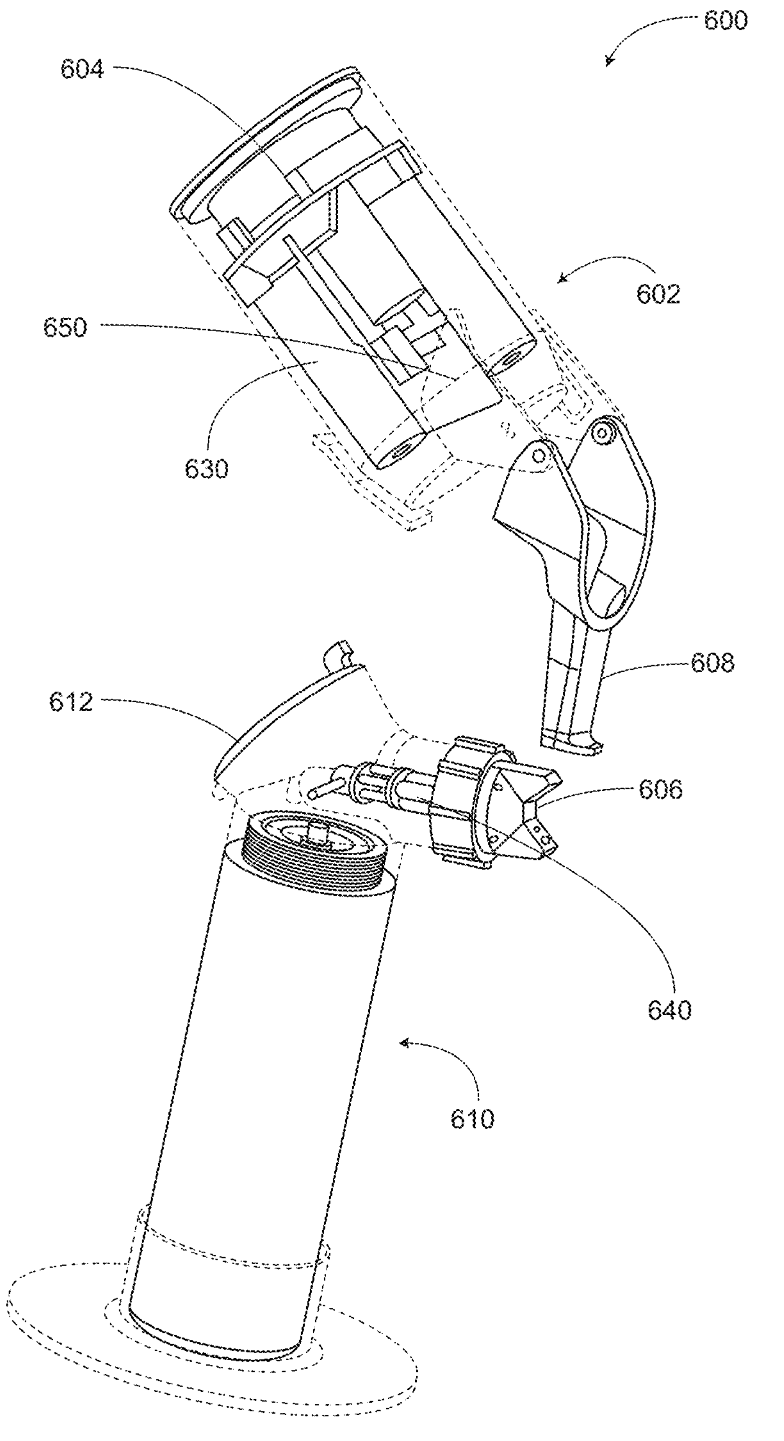

FIGS. 6A-6C (collectively referred to as FIG. 6) are diagrammatic views showing another example of a fluid sprayer 600. Sprayer 600 illustratively includes base assembly 602, which is configured to house circuitry 650 and air source 604. As previously indicated, air source 604 is configured to draw air into sprayer 600 in order to atomize the paint and facilitate fluid flow out of spray tip 606. Sprayer 600 also includes cartridge assembly 610, which includes a valve 640 configured to allow fluid flow through spray tip 606 upon actuation by actuator 608. As shown, when sprayer 600 is not in use, valve 640 is fixed into a closed position that prevents paint leakage. Sprayer 600 additionally includes a power supply 630 disposed within base assembly 602 and adjacent to circuitry 650. In this way, sprayer 600 utilizes a compact design in which air source 604, power supply 630, and circuitry 650 are all disposed within base assembly 602. In one example, the power supply can include a plurality of batteries. However, it is expressly contemplated that other power sources can be used for power supply 630 as well. Power supply 630 is configured to provide power to sprayer 600, and particularly to air source 604.

Sprayer 600 further includes actuator 608, which is configured to couple to cartridge assembly 610 in the manner described above with respect to FIG. 2. Base assembly 602 is coupled to cartridge assembly 610 via a coupling mechanism 612 Additionally, cartridge assembly 610 can be, in one example, the fluid cartridge described below with respect to FIG. 9. However, it is expressly contemplated that cartridge assembly 610 can be a different type of cartridge as well, such as the cartridges discussed below with respect to FIGS. 10-13.

As illustrated in FIG. 6, sprayer 600 also includes bottom portion 614, which is configured to couple to the distal end of cartridge assembly 610 to provide a flat surface such that sprayer 600 can be placed by a user in an upright position. In the illustrated example, actuator 608 is a trigger. However, in other examples, other types of actuators can be used as well. Additionally, as shown, fluid line 620 is disposed within cartridge assembly 610 and is configured to allow fluid flow therethrough upon the opening of valve 640. In one example, fluid line 620 is extended through cartridge assembly 610 to its distal end such that cartridge assembly 610 can be substantially emptied upon use of sprayer 600, if desired. In one example operation, a user grips cartridge assembly 610 and squeezes actuator 608 in order to allow fluid flow through fluid line 620 and out of tip 606. During operation, air source 604 supplies airflow through base assembly 602 and towards cartridge assembly 610 and tip 606, thus allowing a paint spray to be emitted.

Figure 7A:
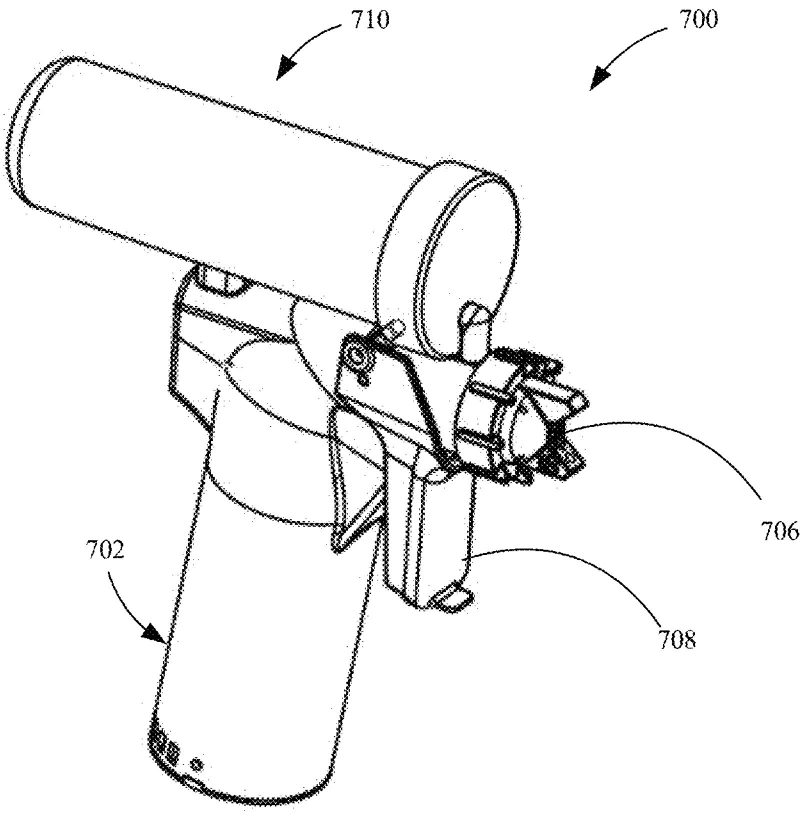
FIGS. 7A-7C (collectively referred to as FIG. 7) are diagrammatic views showing another example of a fluid sprayer.
Figure 7B:
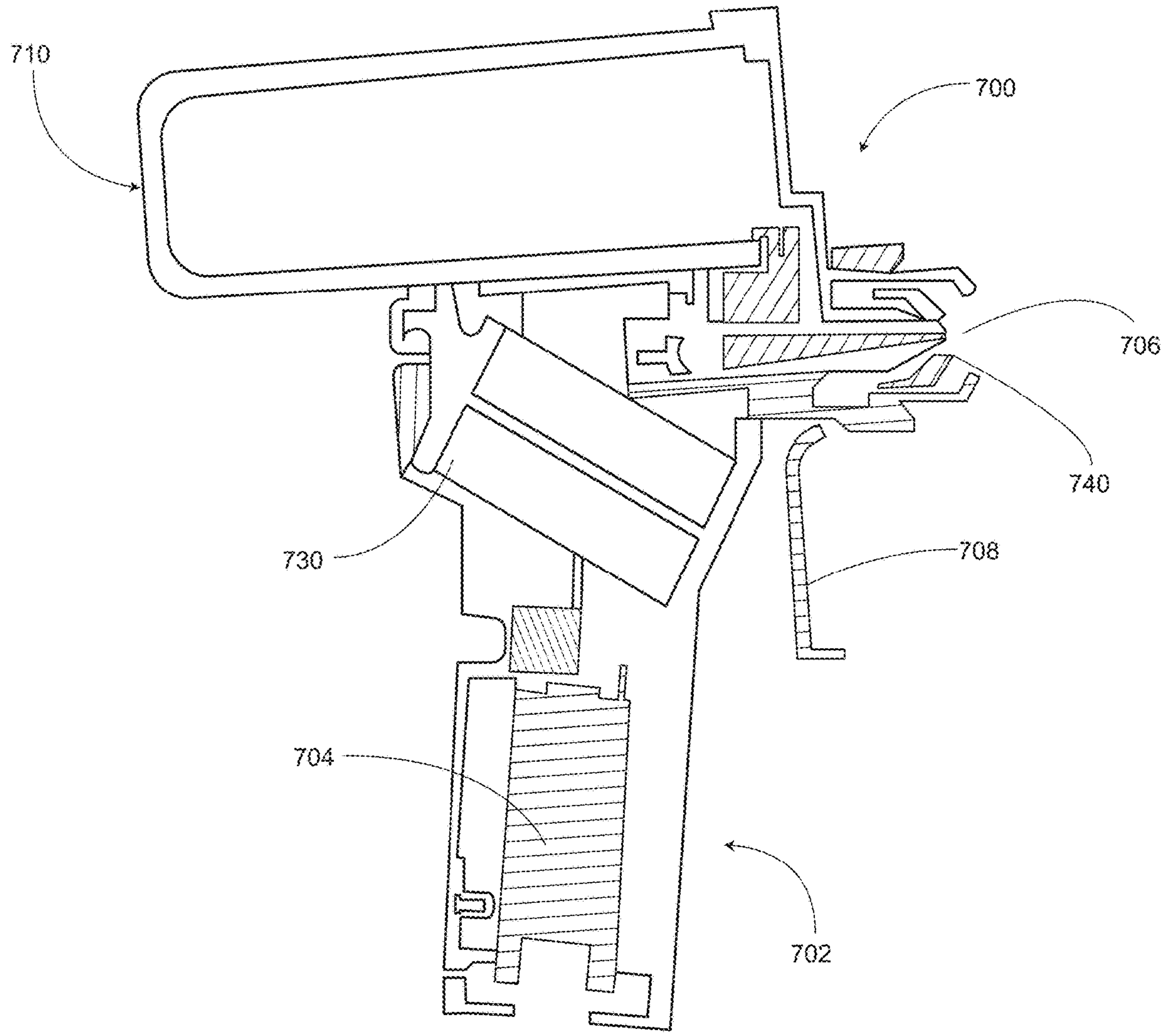
Figure 7C:
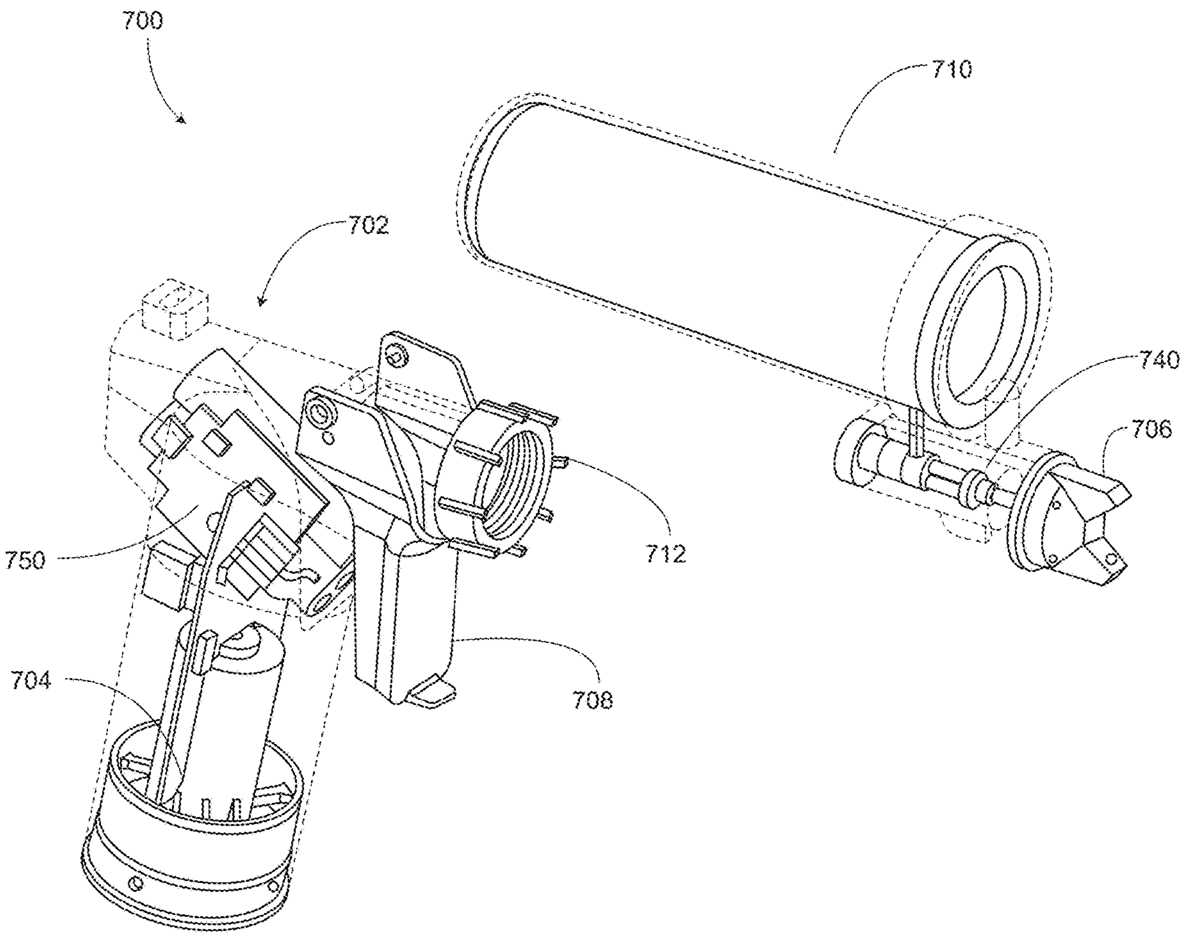

FIGS. 7A-7C (collectively referred to as FIG. 7) are diagrammatic views showing another example of a fluid sprayer 700. Sprayer 700 operates in a similar manner as sprayer 200 described above with respect to FIG. 2. Sprayer 700 illustratively includes base assembly 702, which is configured to house circuitry 750 and air source 704. As previously indicated, air source 704 is configured to draw air into sprayer 700 in order to pressurize cartridge assembly 710 and atomize the paint to facilitate fluid flow out of spray tip 706. Cartridge assembly 710 includes valve 740 configured to allow fluid flow through spray tip 706 upon actuation by actuator 708. As shown, when sprayer 700 is not in use, valve 740 is fixed into a closed position that prevents paint leakage. Upon actuation of actuator 708, valve 740 can move to an open position to direct fluid flow from cartridge assembly 710 to spray tip 706. Sprayer 700 additionally includes a power supply 730 generally disposed within base assembly 702 and adjacent to circuitry 750. In this way, sprayer 700 utilizes a compact design in which air source 704, power supply 730, and the associated circuitry 750 are all disposed within base assembly 702. In one example, power supply 730 can include a plurality of batteries. However, it is expressly contemplated that another power source can be used as power supply 730 as well.

As noted above, sprayer 700 further includes actuator 708, which is configured to couple to and actuate valve 740. Actuator 708 is coupled to valve 740 via a coupling mechanism 712. In one example, coupling mechanism 712 is a threaded fastener. Additionally, cartridge assembly 710 can be, in one example, the cartridge assembly described below with respect to FIG. 9. As shown, cartridge assembly 710 is disposed above base assembly 702 in a horizontal position.

As shown in FIG. 7, actuator 708 is a trigger. However, in other examples, other types of actuators can be used as well. In one example operation, a user grips base assembly 702 and squeezes actuator 708, which causes valve 740 to move to an open position, and paint to be driven out of sprayer 700 by the pressurized environment of cartridge assembly 710 provided by air source 704.

Figure 8A:
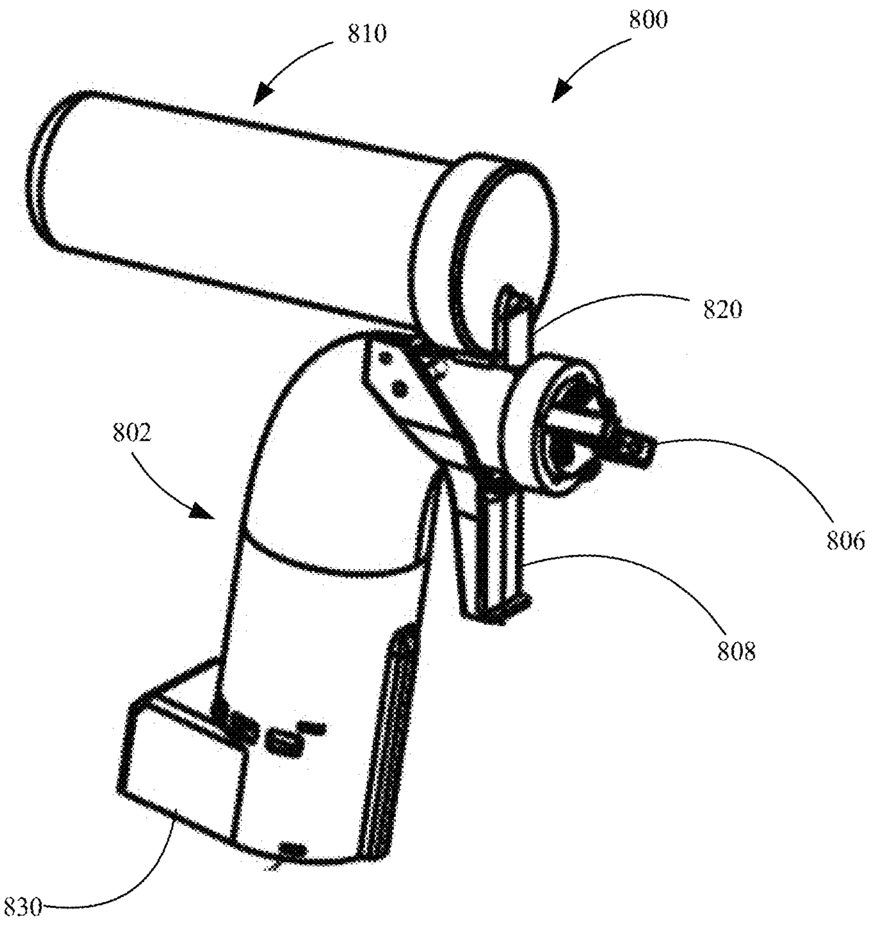
FIGS. 8A-8C (collectively referred to as FIG. 8) are diagrammatic views showing another example of a fluid sprayer.
Figure 8B:
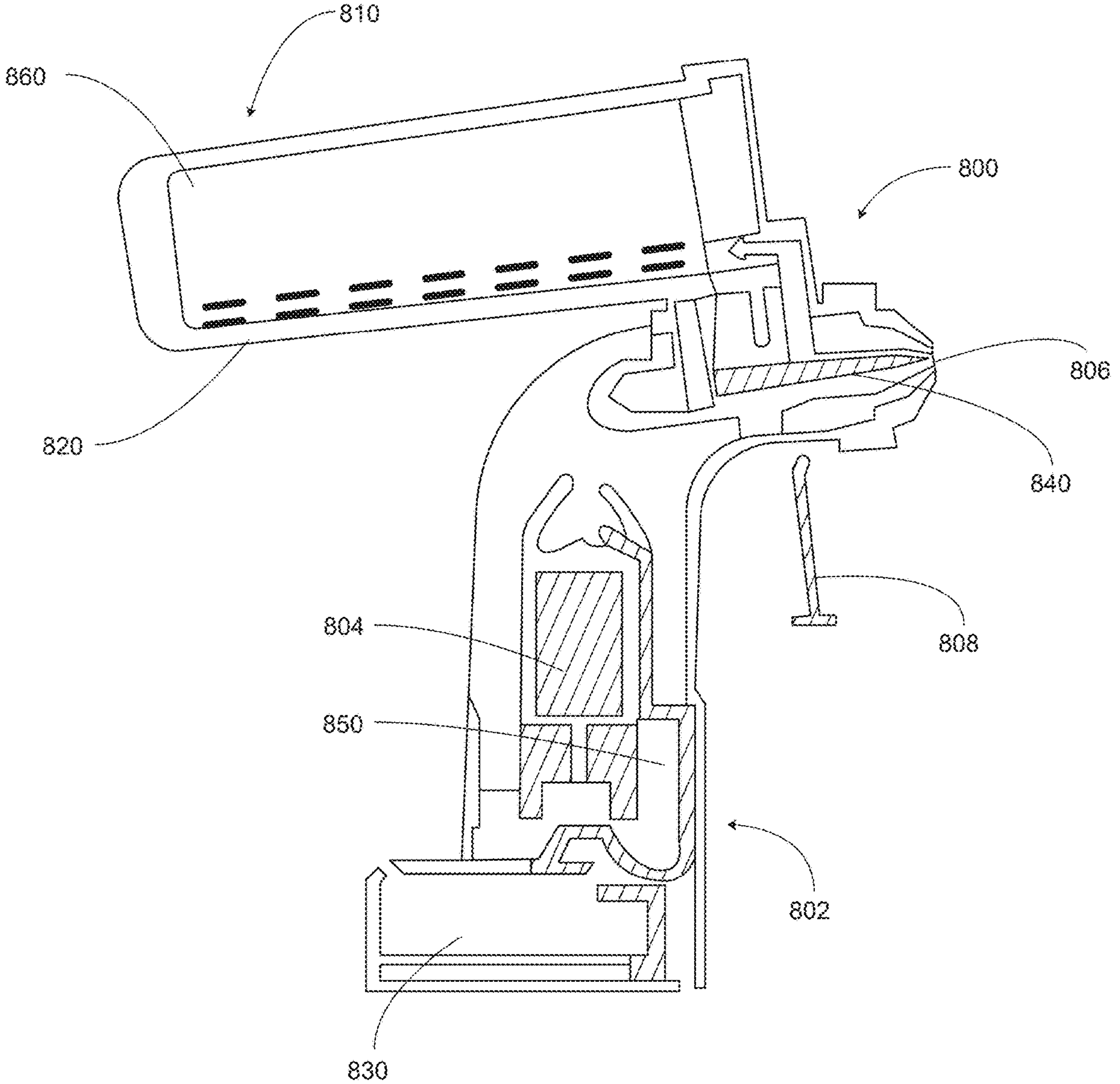
Figure 8C:
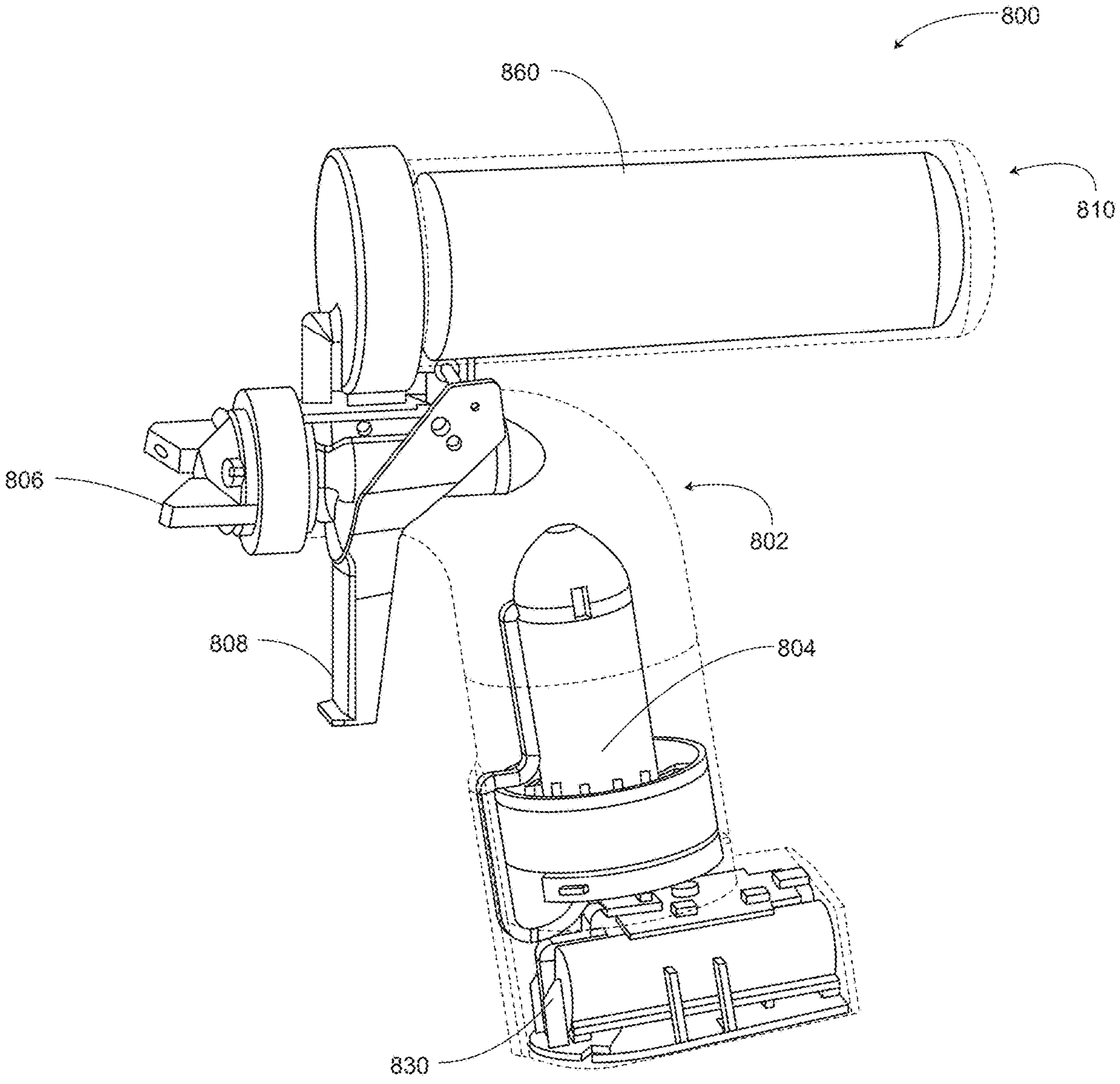

FIGS. 8A-8C (collectively referred to as FIG. 8) are diagrammatic views showing another example of a fluid sprayer 800. Sprayer 800 illustratively includes base assembly 802, which is configured to house circuitry 850 and air source 804. As previously indicated, air source 804 is configured to draw air into sprayer 800 in order to pressurize cartridge assembly 810 and atomize the paint to facilitate fluid flow out of spray tip 806. Cartridge assembly 810 includes valve 840 configured to allow fluid flow through spray tip 806 upon actuation by actuator 808. As shown, when sprayer 800 is not in use, valve 840 is fixed into a position that prevents paint leakage. Additionally, Sprayer 800 includes a power supply 830 disposed at a distal end of base assembly 802. Disposing power supply 830 near the distal end of body 802 allows for a user to easily replenish the power source while still retaining compactness. For instance, power supply 830 can be a plurality of disposable batteries, in which a user is required to change the batteries upon depletion. In another example, power supply 830 can be a rechargeable battery, in which a user can need to disconnect the power source for charging. Power supply 830 is configured to provide power to sprayer 800, and particularly to air source 804.

As noted above, sprayer 800 includes actuator 808, which is configured to couple to and actuate valve 840 of cartridge assembly 810. Cartridge assembly 810 can be coupled to base assembly 802 by, for example, a coupling mechanism (not shown). The coupling mechanism can be, for example, similar to coupling mechanism 212 described above with respect to FIG. 2. Additionally, in one example, cartridge assembly 810 can be the cartridge assembly described below with respect to FIG. 9. However, it is expressly contemplated that cartridge assembly 810 can be a different type of cartridge as well, such as the cartridges discussed below with respect to FIGS. 10-13. As shown, fluid reservoir 810 is configured to be disposed above base assembly 802 in a horizontal position.

Cartridge assembly 810 illustratively includes an internal portion 860, which is configured to compress in response to the pressurized environment created by air source 804 upon actuation of actuator 808 in order to enable consistent fluid flow through fluid line 820. As illustrated, actuator 808 is a trigger. However, in other examples, other types of actuators can be used as well. In operation, a user grips base assembly 802 and applies a force to actuator 808, which causes valve 840 to move to an open position and internal portion 860 of cartridge assembly 810 to compress by the airflow and corresponding pressure provided by air source 804, thereby forcing paint through fluid line 820 and out of spray tip 806. In one example, fluid line 820 comprises a perforated tube disposed within cartridge assembly 810. The perforated tube allows paint to be sprayed at a plurality of different angles and substantially empty the paint housed within cartridge assembly 810.

Figure 9:
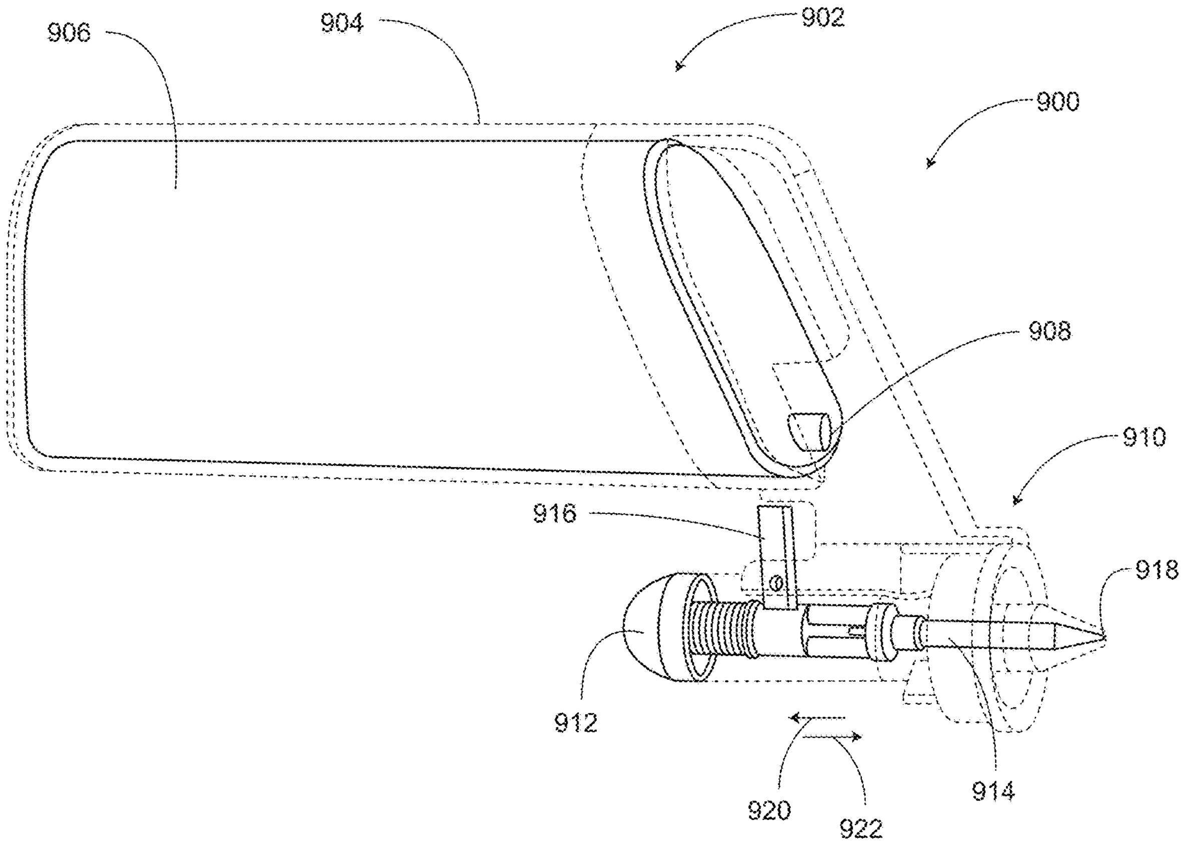
FIG. 9 is a diagrammatic view showing one example cartridge assembly.

FIG. 9 is a diagrammatic view showing one example cartridge assembly. As shown, cartridge assembly 900 generally includes cartridge portion 902 and valve portion 910. Cartridge portion 902 illustratively includes a rigid housing 904 and reservoir 906 configured to house paint therein. As described above with respect to FIG. 2, rigid housing 904 is configured to provide a pressurized environment for reservoir 906. Cartridge portion 902 is configured to receive a portion of airflow from an air source via a pressure inlet (e.g., pressure inlet 258) when coupled to a base portion of a handheld fluid sprayer. In one example, reservoir 906 can be a compressible reservoir, such as a fluid bag. In this way, as valve portion 910 is moved to an open position, the pressure created by the received airflow drives the paint through channel 908 and causes reservoir 906 to compress relative to the paint volume transferred.

As shown, valve portion 910 illustratively includes valve 912. In the example shown in FIG. 9, valve 912 is a needle valve having a needle 914. However, in other examples, a different type of valve can be utilized as well. Valve portion 910 can also include linkage 916 configured to mechanically link cartridge assembly 900 to a base assembly of the handheld fluid sprayer. As previously described with respect to FIG. 2, linkage 916 can link valve 912 to an actuator on the base assembly via a slot. In operation, when cartridge assembly 900 is coupled to a base assembly, an actuator on the base assembly can cause valve 912 to move to an open position upon actuation to drive paint from cartridge portion 902 to spray tip 918. For example, the actuator (e.g., a trigger, not shown) can cause a mechanical portion within the base assembly to translate in a direction that rotates linkage 916 in a clockwise direction, thereby causing needle 914 to move in a reverse direction, generally indicated by arrow 920, such that the valve shifts to its open position. Upon release of the actuator, the mechanical portion translates in a direction that causes linkage 916 to rotate in a counterclockwise direction, thereby causing needle 914 to move in a forward direction, generally indicated by arrow 922, such that valve 912 returns to its closed position. In this way, fluid flow is controlled by valve 912 relative to actuation of the actuator.

In one example, cartridge assembly 900 is disposable and pre-filled. Specifically, reservoir 906 is pre-filled with paint and is a fixed and integral portion of cartridge assembly 900. Additionally, valve portion 910 is also a fixed and integral portion of cartridge assembly 900. In operation, a user can replace cartridge assembly 900 with a new cartridge assembly when desired. For example, if the pre-filled cartridge reservoir 906 has been depleted, a user can conveniently replace cartridge assembly 900 with a new cartridge assembly. By having valve portion 910 as an irremovable and integral portion of cartridge assembly 900, valve portion 910 is also replaced when cartridge assembly 900 is replaced with a different cartridge assembly, thus removing the need for cleaning and/or maintenance of valve 912. For example, the need to unclog valve 912 from dried paint accumulated during a spraying operation is removed.

Rigid housing 904 is also fixed and integral to cartridge assembly 900. Specifically, housing 904 is fixed such that housing 904 cannot be removed from and/or rotated about cartridge assembly 900. Additionally, rigid housing 904 is configured such that housing 904 does not move laterally or longitudinally from an external force. By integrating housing 904 to be fixed and irremovable from cartridge assembly 900, a user is prevented from manually re-filling cartridge reservoir 906, which could otherwise cause clogging and/or other functional malfunctions to valve 912. Additionally, by preventing housing 904 from being rotatable, movable, and/or removable, the pressure inlet (e.g., pressure inlet 258) remains aligned with the pressure outlet (e.g., pressure outlet 220).

Figure 10:
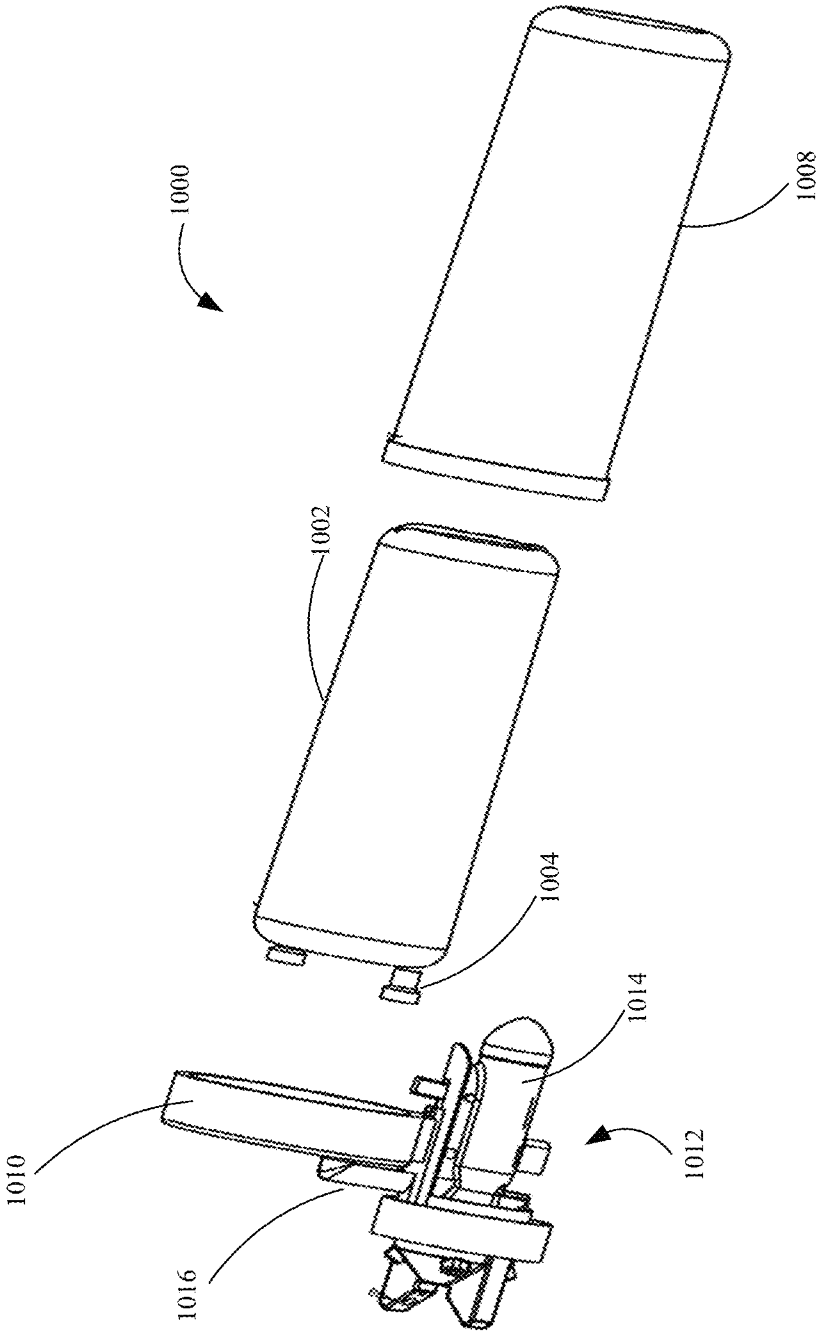
FIG. 10 is an exploded view showing another example cartridge assembly.

FIG. 10 is an exploded view showing another example cartridge assembly. Cartridge assembly 1000 illustratively includes reservoir 1002 configured to retain paint. Reservoir 1002 can be formed of a compressible material such that reservoir 1002 can be compressed under sufficient pressure provided by an air source in order to allow for consistent fluid flow. For instance, reservoir 1002 can be a compressible bag. The bag can be, in one example, formed of a plastic material. Additionally, the bag can be sized such that it can hold a sufficient amount of paint. For instance, in one example, reservoir 1002 is sized such that reservoir 1002 can fit about 250 milliliters (mL) of paint. However, in other examples, reservoir 1002 can be sized to hold a different amount of paint relative to the surface of interest to be sprayed.

Reservoir 1002 further includes valve 1004 configured to couple to a corresponding portion of coupler 1010. In one example, valve 1004 can be a duck-bill valve. However, in other examples, a different type of valve can be utilized as well. Cartridge assembly 1000 further includes rigid housing 1008. Rigid housing 1008 is configured to house reservoir 1002. Specifically, housing 1008 is sized such that housing 1008 can retain reservoir 1002 and couple to coupler 1010 with reservoir 1002 disposed therein. Rigid housing 1008 is further configured to retain pressure within the spraying system. In this way, rigid housing 1008 provides a pressurized environment in which reservoir 1002 can be compressed by airflow upon actuation. In one example, housing 1008 can be formed from plastic. However, in other examples, housing 1008 can be formed from a different material as well.

Cartridge 1000 further includes coupler 1010, which is configured to couple to reservoir 1002 and housing 1008. Specifically, as shown, valve 1004 is configured to couple to fluid line 1016 of coupler 1010 in order to allow fluid flow therethrough. Additionally, coupler 1010 is sized such that coupler 1010 can retain housing 1008.

As illustrated in FIG. 10, fluid line 1016 is configured to provide the paint contained within reservoir 1002 to valve portion 1012. Valve portion 1012 includes valve 1014, which is configured to allow fluid flow through fluid line 1016 and out of the spray tip upon actuation of the fluid sprayer. In operation, valve 1014 can retract upon actuation, causing paint to flow from reservoir 1002 to the spray tip. During actuation, an air source supplies airflow through the sprayer and towards the spray tip, thus allowing a paint spray to be emitted.

Figure 11:
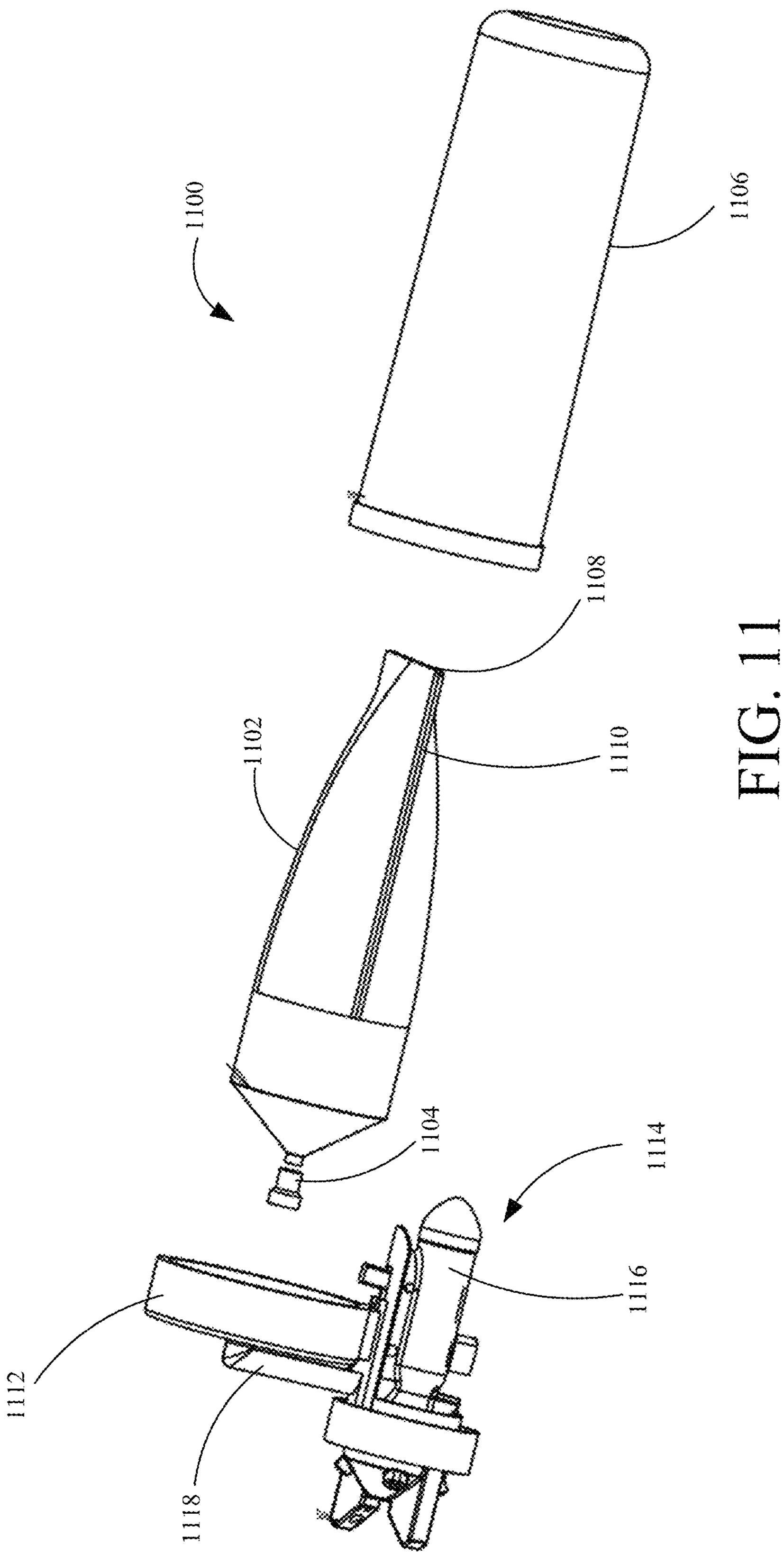
FIG. 11 is an exploded view showing another example cartridge assembly.

FIG. 11 is an exploded view showing another example of a cartridge assembly. Cartridge assembly 1100 illustratively includes reservoir 1102 configured to retain paint. Reservoir 1102 is formed of a compressible material such that reservoir 1102 can be compressed under sufficient pressure in order to allow for consistent fluid flow. For instance, reservoir 1102 can be a compressible bag shaped in a different manner than the reservoir described above with respect to FIG. 10. Specifically, as shown, reservoir 1102 is shaped with a narrow end, enabling convenient compression of reservoir 1102. The bag can be, in one example, formed of a plastic material. Additionally, the bag can be sized such that it can hold any desired amount of paint (e.g., 250 mL).

Reservoir 1102 further includes valve 1104 configured to couple to a corresponding portion of coupler 1112. As noted above, valve 1104 can be a duck-bill valve or other type of valve. Further, reservoir 1102 includes a fluid line 1110 coupled to valve 1104 and disposed within reservoir 1102. As shown, fluid line 1110 is configured to extend to the opposing end of reservoir 1102 and contact the paint disposed therein. In one example, fluid line 1110 includes one or more apertures (not shown) configured to provide multiple entrance points for the paint.

Cartridge 1100 further includes rigid housing 1108. Housing 1108 is configured to house reservoir 1102. Housing 1108 is further configured to retain pressure within the spraying system created by an air source. In this way, housing 1108 provides an environment in which reservoir 1102 can be compressed by airflow upon actuation. Housing 1108 can be formed from plastic. However, in other examples, housing 1108 can be formed from a different material (e.g., cardboard).

Cartridge 1100 further includes coupler 1112, which is configured to couple to reservoir 1102 and housing 1108. Specifically, as shown, valve 1104 is configured to couple to fluid line 1118 of coupler 1112 in order to allow fluid flow therethrough from fluid line 1110. Fluid line 1118 is configured to provide the paint contained within reservoir 1102 to valve assembly 1114. As detailed above, valve assembly 1114 includes valve 1116, which is configured to allow fluid flow through fluid line 1118 and out of the spray tip upon actuation of the sprayer.

Figure 12:
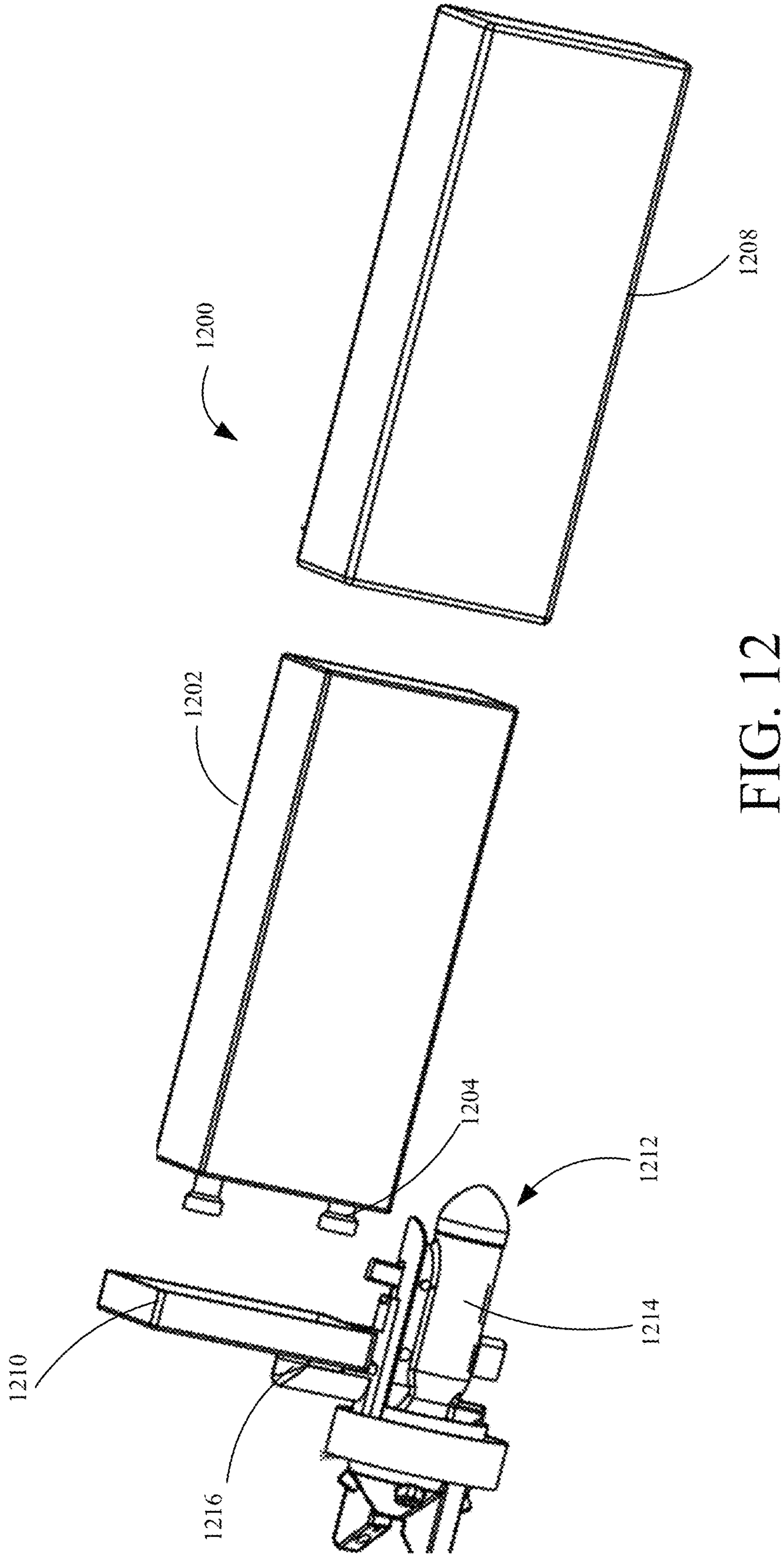
FIG. 12 is an exploded view showing another example cartridge assembly.

FIG. 12 is an exploded view showing another example of a cartridge assembly. Cartridge assembly 1200 illustratively includes reservoir 1202 configured to retain paint. Reservoir 1202 can be formed of a compressible material such that reservoir 1202 can be compressed under sufficient pressure in order to allow for consistent fluid flow. For instance, reservoir 1202 is illustrated as a compressible box. The box can be, in one example, formed of a cardboard material. Additionally, the box can be sized such that it can hold a sufficient amount of paint (e.g., 250 mL).

Reservoir 1202 further includes valve 1204 configured to couple to a corresponding portion of coupler 1210. Cartridge assembly 1200 further includes rigid housing 1208. Housing 1208 is configured to house reservoir 1202. Specifically, as shown, housing 1208 has a shape corresponding to the box-like shape of reservoir 1202 in order to adequately house reservoir 1202. Housing 1208 is further configured to retain pressure within the spraying system. In this way, housing 1208 provides an environment in which reservoir 1202 can be compressed by airflow upon actuation. Housing 1208 can be formed from plastic. However, in other examples, housing 1208 can be formed from a different material (e.g., cardboard).

Cartridge assembly 1200 further includes coupler 1210, which is configured to couple to reservoir 1202 and housing 1208. Specifically, as shown, valve 1204 is configured to couple to fluid line 1216 of coupler 1210 in order to allow fluid flow therethrough. As detailed above, valve assembly 1212 includes valve 1214, which is configured to allow fluid flow through fluid line 1216 and out of the spray tip upon actuation of the sprayer.

Figure 13:
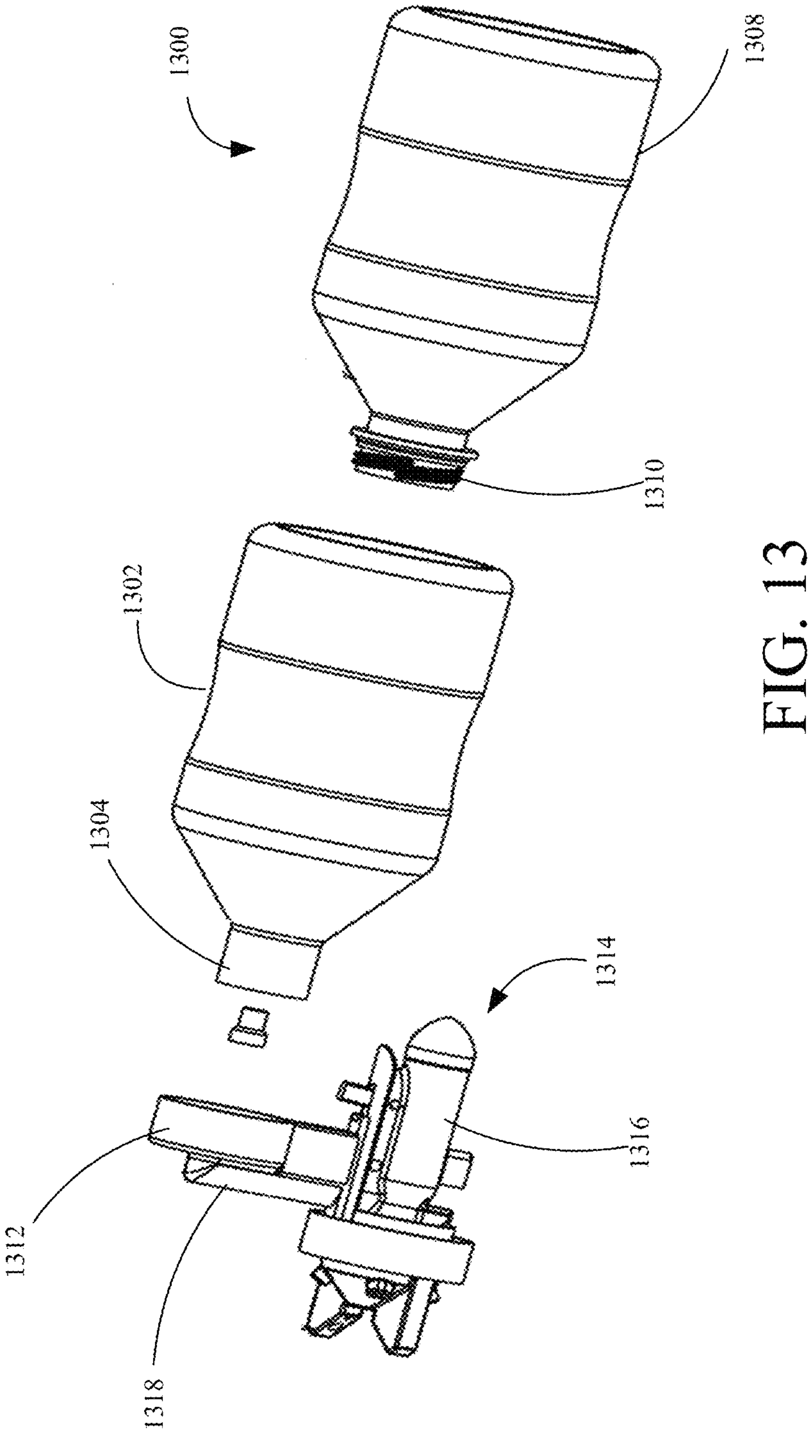
FIG. 13 is an exploded view showing another example cartridge assembly.

FIG. 13 is an exploded view showing another example of a sprayer cartridge. Cartridge assembly 1300 illustratively includes reservoir 1302 configured to retain paint. Reservoir 1302 can be formed of a compressible material such that reservoir 1302 can be compressed under sufficient pressure in order to allow for consistent fluid flow. For instance, reservoir 1302 is illustrated as a compressible bottle. The bottle can be, in one example, formed of a plastic material. Additionally, the bottle can be sized such that it can hold a sufficient amount of paint (e.g., 250 mL). Reservoir 1302 further includes valve 1304 configured to couple to a corresponding portion of coupler 1312.

Cartridge assembly 1300 further includes rigid housing 1308. Housing 1308 is configured to house reservoir 1302. Specifically, as shown, housing 1308 has a shape corresponding to the bottle-like shape of reservoir 1302 in order to adequately house reservoir 1302. Housing 1308 is further configured to retain pressure within the spraying system. In this way, housing 1308 provides an environment in which reservoir 1302 can be compressed by pressure generated from the air source upon actuation. Housing 1308 can be formed from plastic. However, in other examples, housing 1308 can be formed from a different material (e.g., cardboard).

Cartridge assembly 1300 further includes coupler 1312, which is configured to couple to reservoir 1302 and Housing 1308. Specifically, as shown, threaded portion 1310 of housing 1308 is configured to threadably couple to coupler 1312. Additionally, valve 1304 is configured to couple to fluid line 1318 of coupler 1312 in order to allow fluid flow therethrough. Fluid line 1318 is configured to provide the paint contained within reservoir 1302 to valve portion 1314. As detailed above, valve portion 1314 includes valve 1316, which is configured to allow fluid flow through fluid line 1318 and out of the spray tip upon actuation of the sprayer.

Figure 14A:
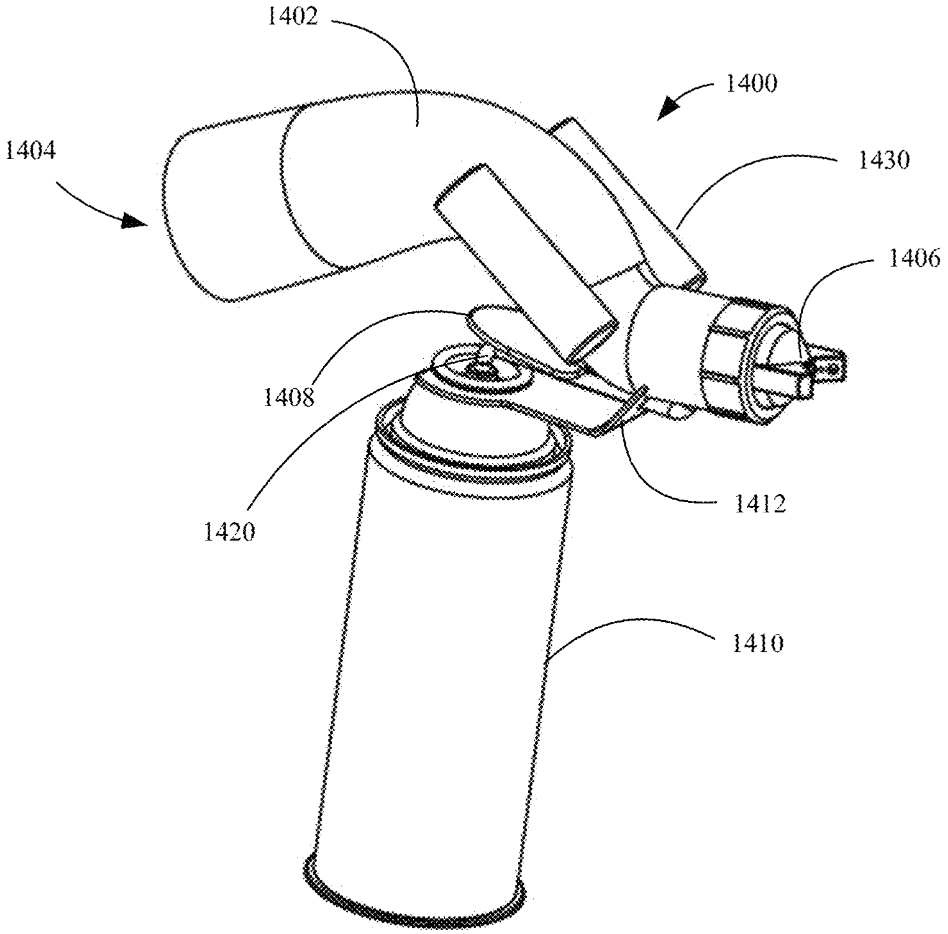
FIGS. 14A-14C (collectively referred to as FIG. 14) are diagrammatic views showing another example of a fluid sprayer.
Figure 14B:
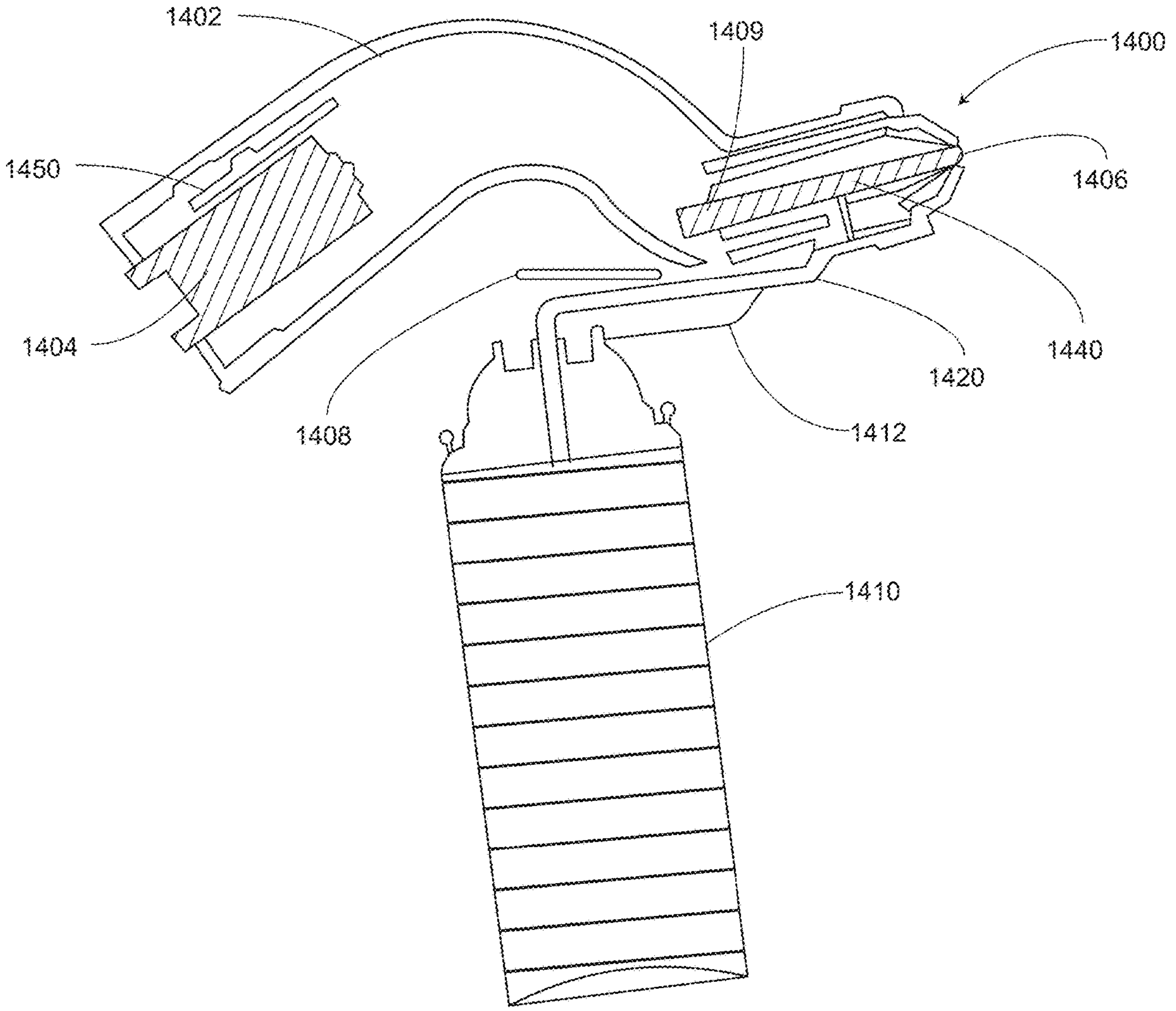
Figure 14C:
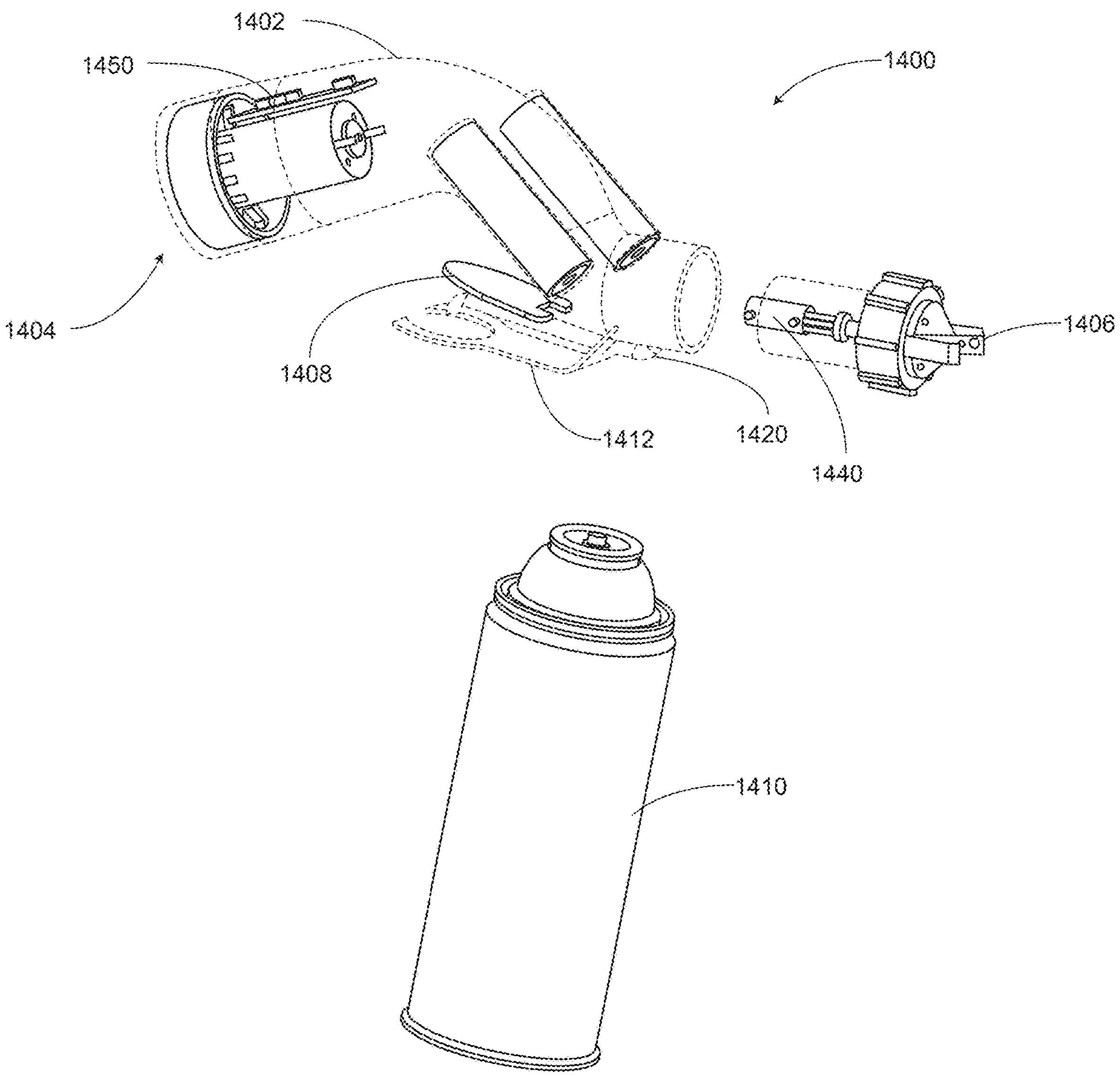

FIGS. 14A-14C (collectively referred to as FIG. 14) are diagrammatic views showing one example of a fluid sprayer 1400. As shown, sprayer 1400 is a cordless air sprayer. Sprayer 1400 illustratively includes a body 1402, which is configured to house circuitry 1450 and a turbine generally indicated by arrow 1404. Turbine 1404 is configured to draw sufficient air into sprayer 1400 in order to facilitate fluid flow out of spray tip 1406 and allow for proper paint atomization. Circuitry 1450 is configured to control turbine 1404 in order to allow sufficient airflow through body 1402 in order to pressurize sprayer 1400. Sprayer 1400 additionally includes power supply 1430. As illustrated in FIG. 14, power supply 1430 includes a plurality of batteries. However, in other examples, another power supply can be used (e.g., cables, rechargeable batteries, etc.). Power supply 1430 is configured to provide power to sprayer 1400, such as turbine 1404.

Sprayer 1400 further includes actuator 1408, which is configured to couple to and actuate fluid reservoir 1410. Sprayer 1400 is coupled to fluid reservoir 1410 via clamp 1412. As shown, fluid reservoir 1410 is a spray can (e.g., an aerosol can). However, it is expressly contemplated that fluid reservoir 1410 can be a different type of reservoir as well. Additionally, in the illustrated example, actuator 1408 is a trigger. However, in other examples, other types of actuators can be used as well. In one example operation, turbine 1404 is actuated to supply a flow of air from nozzle 1406. Actuator 1408 is in a position that closes a valve 1409, preventing paint from flowing from fluid reservoir 1410. A user applies a downward force to actuator 1408 in order to retract valve 1409, thus allowing fluid flow through fluid line 1420 and out of tip 1406. During operation, turbine 1404 supplies airflow through body 1402 and towards tip 1406, thus allowing a paint spray to be emitted. Spray tip 1406 further includes a tip nozzle 1440 configured to allow fluid flow through spray tip 1406 upon actuation by actuator 1408. As shown, when sprayer 1400 is not in use, tip nozzle 1440 is fixed into a position that prevents paint leakage.

Figure 15A:
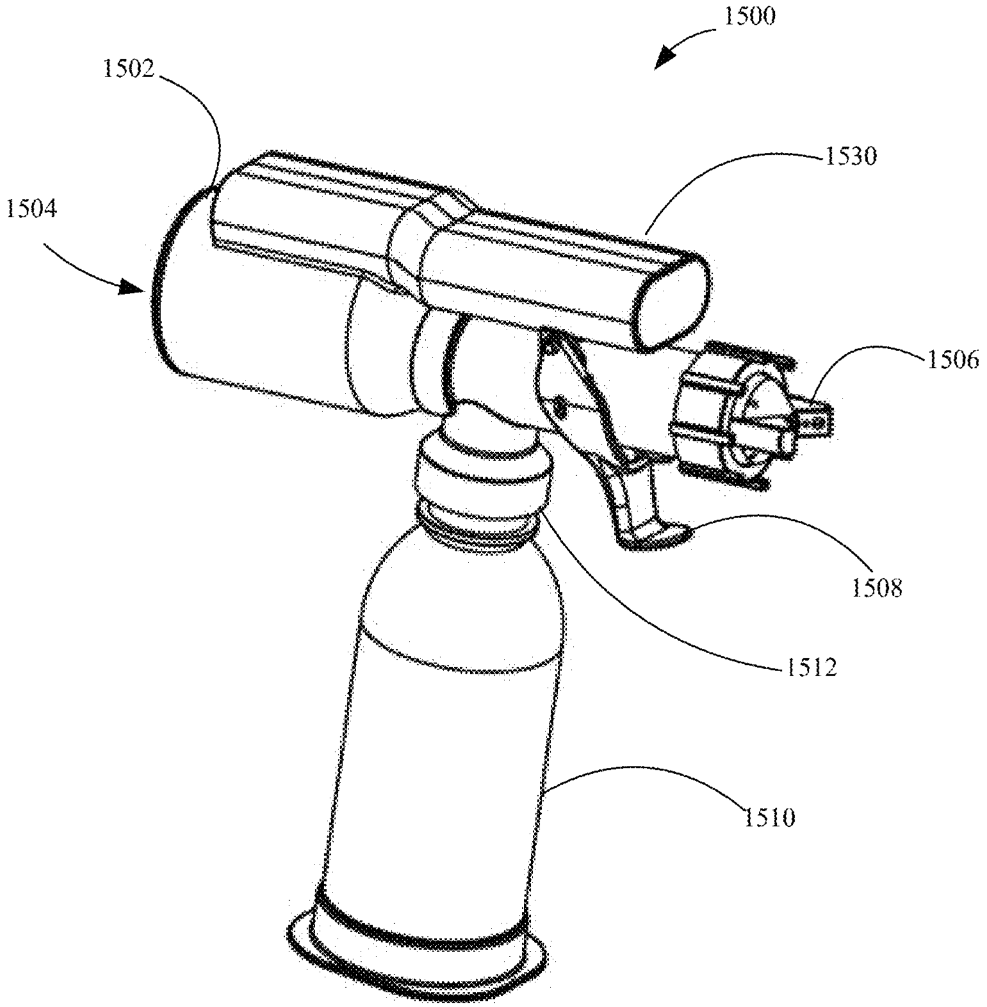
FIGS. 15A-15C (collectively referred to as FIG. 15) are diagrammatic views showing another example of a fluid sprayer.
Figure 15B:
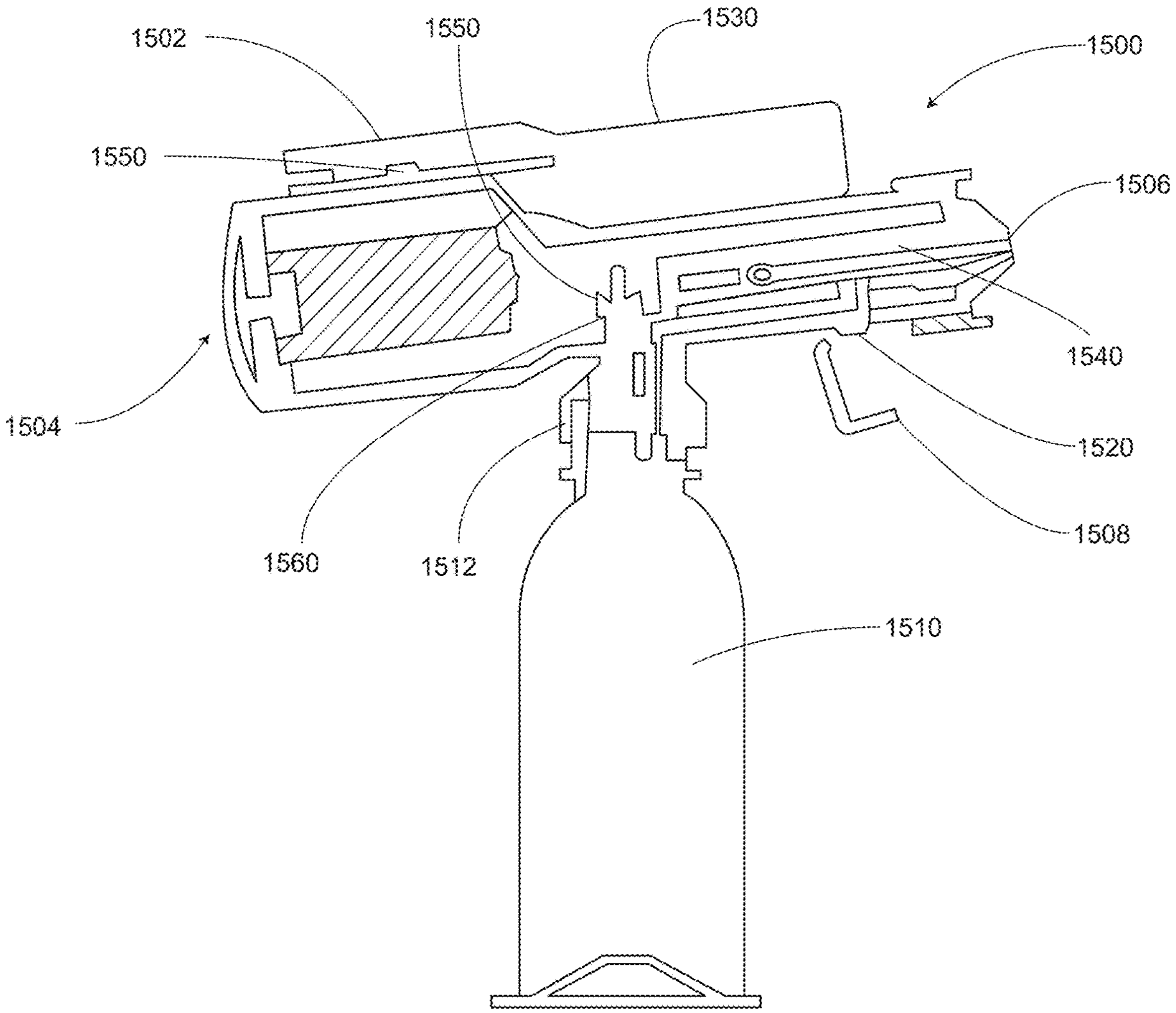
Figure 15C:
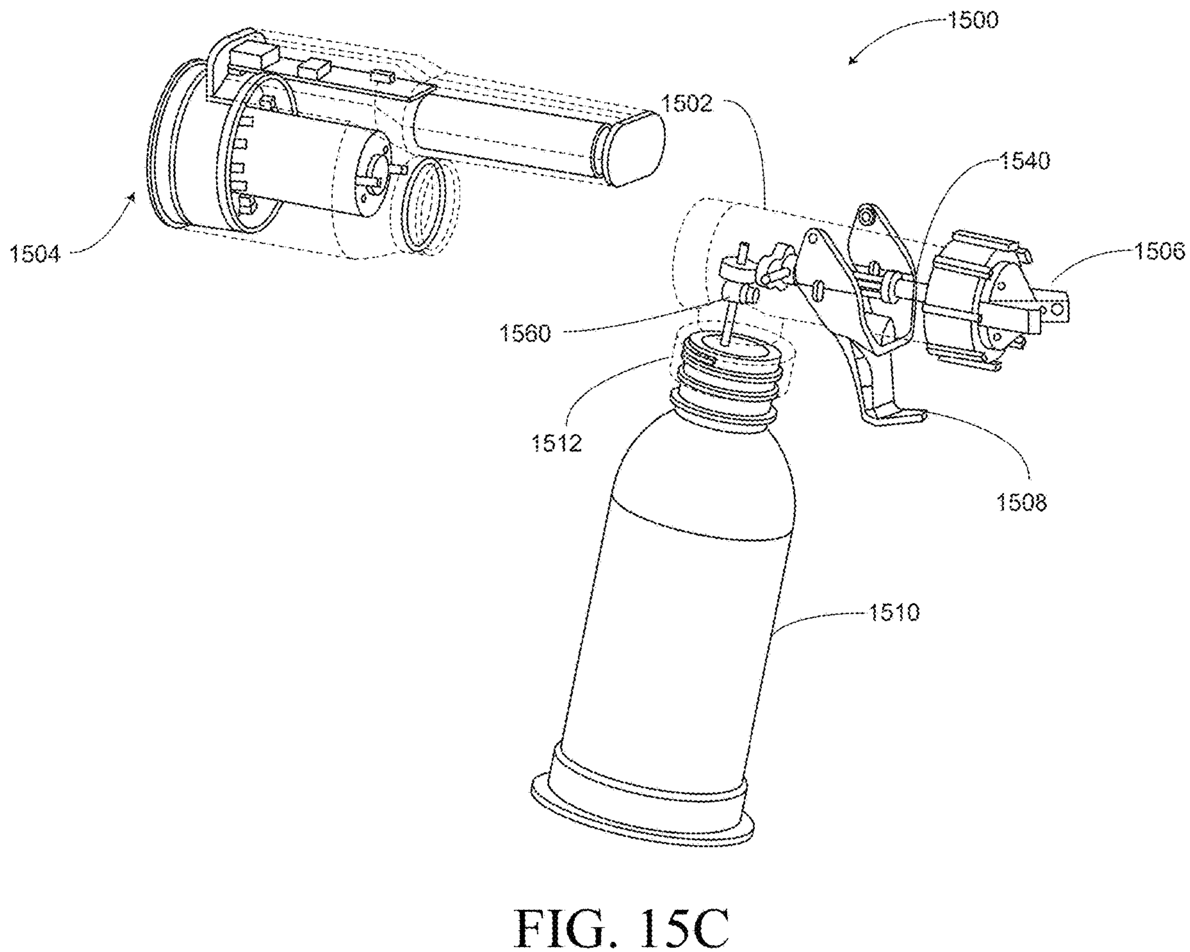

FIGS. 15A-15C (collectively referred to as FIG. 15) are diagrammatic views showing another example of a fluid sprayer 1500. Sprayer 1500 illustratively includes body 1502, which is configured to house circuitry 1550 and a turbine, generally indicated by arrow 1504. Turbine 1504 is configured to draw air into sprayer 1500 in order to atomize the paint and facilitate fluid flow out of spray tip 1506. Spray tip 1506 further includes a tip nozzle 1540 configured to allow fluid flow through spray tip 1506 upon actuation by actuator 1508. As shown, when sprayer 1500 is not in use, tip nozzle 1540 is fixed into a position that prevents paint leakage. Sprayer 1500 additionally includes power supply 1530. As illustrated in the example shown in FIG. 15, a rechargeable battery is utilized as power supply 1530. However, in other examples, another power supply can be used. As indicated above, power supply 1530 is configured to provide power to sprayer 1500 (e.g., turbine 1504).

Sprayer 1500 further includes actuator 1508, which is configured to couple to and actuate fluid reservoir 1510. As shown, sprayer 1500 is coupled to fluid reservoir 1510 via fastener 1512. In one example, fastener 1512 is a threaded fastener configured to rotatably couple to fluid reservoir 1510. Additionally, as shown, fluid reservoir 1510 is a spray can (e.g., an aerosol can). However, it is expressly contemplated that fluid reservoir 1510 can be a different type of reservoir as well.

In the illustrated example, actuator 1508 is a trigger. However, in other examples, other types of actuators can be used as well. In one example operation, a user grips fluid reservoir 1510 and squeezes actuator 1508, which causes needle 1560 to compress into fastener 1512 in order to allow fluid flow through fluid line 1520 and out of tip 1506. During operation, turbine 1504 supplies airflow through body 1502 and towards tip 1506, thus allowing a paint spray to be emitted.

Although the present invention has been described with reference to preferred examples, workers skilled in the art will recognize that changes can be made in form and detail without departing from the spirit and scope of the invention.

What is claimed is:

1. A handheld portable fluid spraying system comprising:

a first disposable cartridge assembly comprising:

- a first cartridge assembly body having a first channel formed therein;
- a first cartridge coupled to the first cartridge assembly body and configured to house a fluid therein; and
- a first valve coupled to the first cartridge assembly body and configured to control a flow of fluid through the first channel to a nozzle, wherein the first valve is actuatable to an open position to allow the flow of fluid to pass through the nozzle;

a base assembly comprising:

- an air source configured to generate an airflow, wherein:
  - a first portion of the airflow is provided to the first disposable cartridge assembly to pressurize the first disposable cartridge assembly, and
  - a second portion of the airflow is provided to the nozzle;
- a power supply configured to power the air source; and
- an actuator configured to control the first valve; and a second disposable cartridge assembly comprising:

- a second cartridge assembly body having a second channel formed therein;
- a second cartridge coupled to the second cartridge assembly body and configured to house a fluid therein; and
- a second valve coupled to the second cartridge assembly body and configured to control a flow of fluid through the second channel to the nozzle, wherein the second valve is actuatable to an open position to allow the flow of fluid to pass through the nozzle;

wherein the first and second disposable cartridge assemblies are interchangeably connectable to the base assembly.

2. The handheld portable fluid spraying system of claim 1, further comprising:

a coupling mechanism configured to couple each of the first disposable cartridge assembly and the second disposable cartridge assembly to the base assembly.

3. The handheld portable fluid spraying system of claim 2, wherein the coupling mechanism comprises a threaded fastener.

4. The handheld portable fluid spraying system of claim 1, wherein the second disposable cartridge assembly is pre-filled with the fluid.

5. The handheld portable fluid spraying system of claim 1, wherein the air source comprises at least one of an air compressor or an air turbine.

6. The handheld portable fluid spraying system of claim 1, wherein the first disposable cartridge assembly comprises:

a linkage configured to removably link the first valve to the actuator, wherein a portion of the linkage is positioned between the first cartridge and the first valve.

7. The handheld portable fluid spraying system of claim 6, wherein the actuator is configured to, when actuated, cause the first valve to move to the open position to drive the fluid through the first channel out of the nozzle.

8. The handheld portable fluid spraying system of claim 1, wherein the first cartridge assembly body and the second cartridge assembly body is fixed to, respectively, the first disposable cartridge assembly and the second disposable cartridge assembly such that the first cartridge assembly body and the second cartridge assembly body is not rotatable relative to the base assembly.

9. The handheld portable fluid spraying system of claim 1, wherein the first disposable cartridge assembly and the second disposable cartridge assembly comprises:

a pressure inlet configured to receive the first portion of the airflow from the air source from a pressure outlet disposed on the base assembly.

10. A method of replacing a fluid source on a handheld fluid sprayer, the method comprising:

disengaging a coupling mechanism that retains a first cartridge assembly to a base assembly of the handheld fluid sprayer, wherein:

the first cartridge assembly comprises:

a first fluid cartridge; and a first valve configured to control a flow of fluid to a nozzle, wherein the first valve is actuatable to an open position to allow the flow of fluid to pass through the nozzle; and the base assembly comprises:

an air source configured to generate an air flow to the nozzle;

a power supply configured to power the air source; and an actuator configured to control the first valve;

decoupling the first cartridge assembly from the base assembly of the handheld fluid sprayer; and coupling a second cartridge assembly to the base assembly, wherein the second cartridge assembly comprises:

a second fluid cartridge; and a second valve configured to control a flow of fluid to the nozzle, wherein the second valve is actuatable to an open position to allow the flow of fluid to pass through the nozzle.

11. The method of claim 10, wherein decoupling the first cartridge assembly from the base assembly comprises removing a linkage of the first cartridge assembly from a slot of the base assembly.

12. The method of claim 11, and further comprising:

disengaging a fastener that secures the first cartridge assembly to the base assembly; and reengaging the fastener to retain the second cartridge assembly to the base assembly.

13. The method of claim 10, wherein the air source comprises an electric motor configured to drive an air pump.

14. The method of claim 13, wherein the air pump comprises at least one of an air compressor or an air turbine.

15. The method of claim 10, wherein the second cartridge assembly is pre-filled with a fluid prior to coupling to the base assembly.

16. The method of claim 10, and further comprising:

operating the air source to provide a first portion of the air flow to pressurize the second fluid cartridge and to provide a second portion of the air flow to the nozzle.

17. The method of claim 10, wherein the actuator is configured to control the second valve upon coupling the second cartridge assembly to the base assembly.

18. The method of claim 17, wherein the actuator is mechanically linked to the second valve by a linkage disposed on the second cartridge assembly.

19. A handheld fluid sprayer comprising:

a cartridge assembly comprising:

a cartridge assembly body having a channel formed therein;

a cartridge coupled to the cartridge assembly body and configured to house a fluid therein;

a valve coupled to the cartridge assembly body and configured to control a flow of fluid through the channel to a nozzle; and a linkage coupled to the valve;

a base assembly configured to removably receive the cartridge assembly, the base assembly comprising:

a handle;

a slot configured to receive the linkage;

an air source configured to generate an airflow, wherein:

a first portion of the airflow is provided to the cartridge to pressurize the cartridge, and a second portion of the airflow is provided to the nozzle;

a power supply configured to power the air source; and an actuator, wherein the linkage is coupled to the actuator and is moveable by the actuator to control a position of the valve.

20. The handheld fluid sprayer of claim 19, wherein the cartridge further comprises:

a rigid cartridge housing coupled to the cartridge assembly body such that the rigid cartridge housing is not rotatable relative to the cartridge assembly body; and a compressible liner disposed within the rigid cartridge housing and configured to house the fluid therein.

* * * * *